US012609955B2

(12) United States Patent
Jirsik et al.

(10) Patent No.: US 12,609,955 B2
(45) Date of Patent: Apr. 21, 2026

(54) TRACKING COMPUTER DEVICES IN EXTENDED DETECTION AND RESPONSE SYSTEMS

(71) Applicant: Cisco Technology, Inc., San Jose, CA (US)

(72) Inventors: Tomas Jirsik, Brno (CZ); Cenek Skarda, Praha Bechovice (CZ); David Sislak, Prague (CZ); Tomas Kuthan, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 18/453,960

(22) Filed: Aug. 22, 2023

(65) Prior Publication Data
US 2024/0356958 A1 Oct. 24, 2024

Related U.S. Application Data

(60) Provisional application No. 63/461,379, filed on Apr. 24, 2023.

(51) Int. Cl.
H04L 9/40 (2022.01)
H04L 43/067 (2022.01)

(52) U.S. Cl.
CPC ........ H04L 63/1433 (2013.01); H04L 43/067 (2013.01); H04L 63/1425 (2013.01); H04L 63/20 (2013.01)

(58) Field of Classification Search
CPC ............... H04L 63/1433; H04L 43/067; H04L 63/1425; H04L 63/20; H04L 63/08; H04L 63/0428; H04L 63/0876; H04L 63/162; H04L 43/16; H04L 43/50; H04L 45/02; H04W 12/06; H04W 8/26; H04W 88/08;
(Continued)

(56) References Cited

U.S. PATENT DOCUMENTS 8,392,998 B1 3/2013 Schrecker et al.
10,750,004 B2 8/2020 Ahmad et al.
(Continued)

FOREIGN PATENT DOCUMENTS

CN 112887310 B 9/2022

OTHER PUBLICATIONS

Cynet, "NIST Incident Response Plan: Building Your Own IR Process Based on NIST Framework," downloaded from https://www.cynet.com/incident-response/nist-incident-response/ on Jun. 21, 2023, 25 pages.
(Continued)

*Primary Examiner* — Ryan J Jakovac
(74) *Attorney, Agent, or Firm* — Lee & Hayes, P.C.

(57) ABSTRACT
This disclosure describes techniques for mapping local device identifiers used in monitoring data from different sources to a common global identifier to enable correlation of monitoring events related to the same device. The techniques can be used in the context of an Extended Detection and Response (XDR) system architecture for advanced threat detection and response in a computer system. In some cases, the XDR system ingests security data from various monitoring components like Endpoint Detection and Response (EDR), Intrusion Detection Systems (IDSs), Intrusion Prevention Systems (IPSs), firewall engines, and email security systems.

19 Claims, 12 Drawing Sheets

(58) Field of Classification Search
CPC ... H04W 24/10; H04W 12/104; H04W 28/26; H04W 28/24; G06F 16/9024
See application file for complete search history.

(56) References Cited

U.S. PATENT DOCUMENTS

| | | | |
|---|---|---|---|
| 11,216,262 B2 | 1/2022 | Czarnecki et al. | |
| 11,218,541 B2 | 1/2022 | Long et al. | |
| 11,290,483 B1 | 3/2022 | Kannan et al. | |
| 11,895,204 B1 | 2/2024 | Khanwalkar et al. | |
| 2004/0044912 A1 | 3/2004 | Connary et al. | |
| 2014/0282905 A1 | 9/2014 | Iyer et al. | |
| 2018/0307735 A1 | 10/2018 | Thayer et al. | |
| 2020/0252415 A1 | 8/2020 | Hamdi | |
| 2022/0329630 A1 | 10/2022 | Li | |
| 2022/0377099 A1 | 11/2022 | Berger et al. | |
| 2023/0113375 A1 | 4/2023 | Thomas et al. | |
| 2023/0117268 A1* | 4/2023 | Rimer ..................... | G06F 21/31 726/17 |
| 2024/0356949 A1 | 10/2024 | Jirsik et al. | |

OTHER PUBLICATIONS

George et at., "XDR: The Evolution of Endpoint Security Solutions—Superior Extensibility and Analytics to Satisfy the Organizational Needs of the Future," International Journal of Advanced Research in Science, Communication and Technology (IJARSCT) (8)1: pp. 493-501 (12 pages), Aug. 2021.

D'estalenx A., et al., "NURSE: eNd-UseR IoT Malware Detection Tool for Smart HomEs", The 2021 7th International Conference on Industrial and Business Engineering, ACMPUB27, New York, NY, USA, Nov. 8-12, 2021, pp. 134-142, XP058864753, DOI: 10.1145/3494322.3494340, ISBN: 978-1-4503-9799-5, The Whole Document.

International Search Report and Written Opinion for International Application No. PCT/US2024/025693, mailed Aug. 5, 2024, 15 Pages.

Invitation to Pay Fees dtd Aug. 12, 2024 for Application No. PCT/US2024/025683, "Tracking Computer Devices In Extended Detection And Response Systems", 26 pages.

International Search Report and Written Opinion for International Application No. PCT/US2024/025683, mailed Oct. 4, 2024, 21 Pages.

* cited by examiner

300 —↘

QUERY OTHER LOCAL IDS
312

RECEIVE A MAPPING QUERY
302

QUERY MAPPING DATA
304

YES

OTHER LOCAL IDS?
310

YES

GLOBAL ID?
306

No

No

PROVIDE FEEDBACK DATA
314

CREATE A NEW GLOBAL ID
308

400

DETERMINE NEW ID SETS BASED ON CONFLICTING NODES
416

RECEIVE A GRAPH
402

YES

CONFLICTING SETS?
414

No

EXPAND ID SETS SYMMETRICALLY
412

IDENTIFY HIGHEST-ORDER NODES
404

INITIALIZE EACH HO NODE AS AN ID SET
410

No

ONE HO NODE?
406

No

YES

ASSIGN A GLOBAL ID TO EACH SET
418

DETERMINE THAT THE WHOLE GRAPH IS A SINGLE ID SET
408

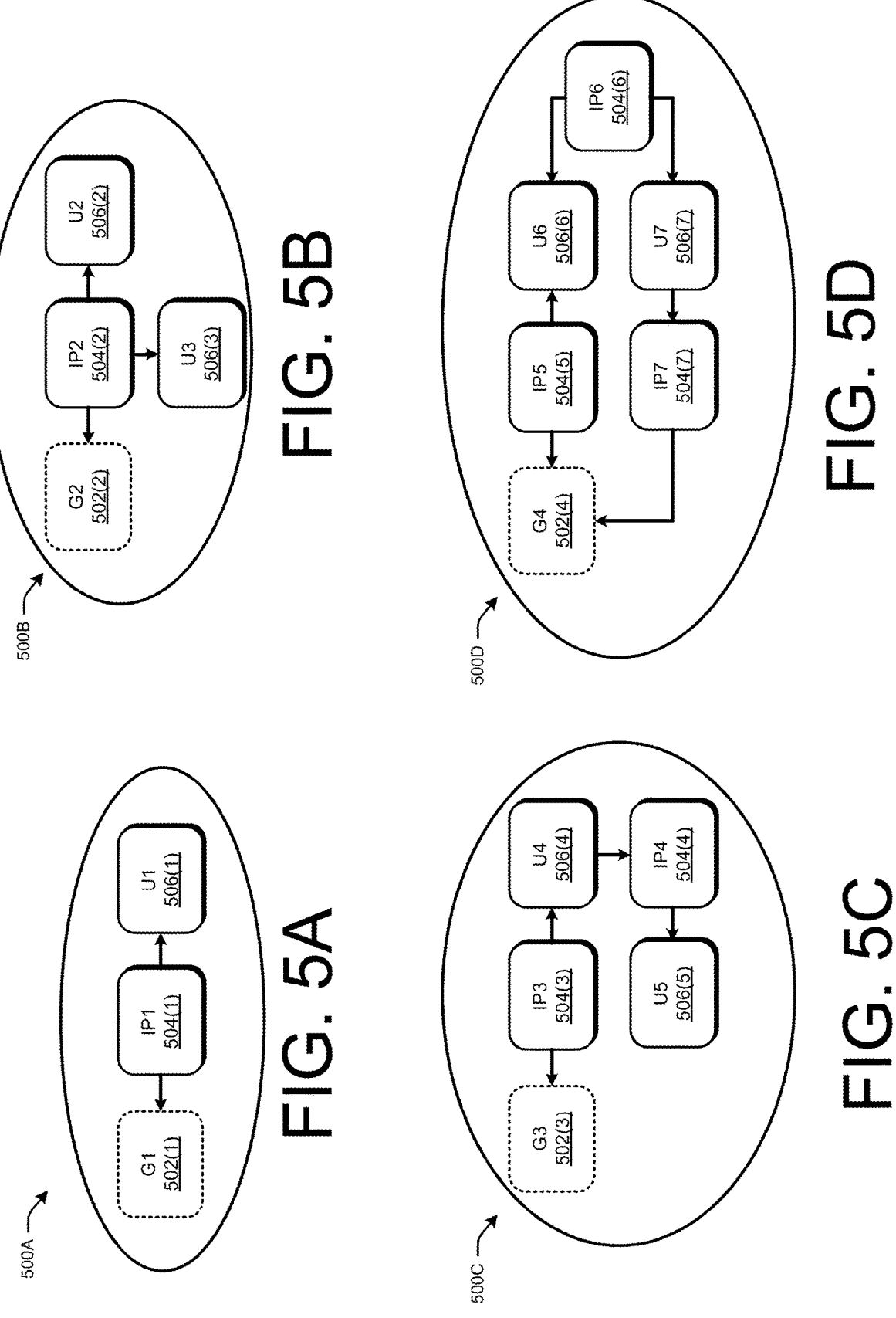

700

RECEIVE A REQUEST TO OBTAIN A GLOBAL DEVICE ID AT A FIRST TIME
702

WAIT FOR THE THRESHOLD PERIOD
704

DETERMINE MONITORING DATA BATCH
706

DETERMINE GLOBAL DEVICE IDENTIFIER
708

PROVIDE THE GLOBAL DEVICE IDENTIFIER
710

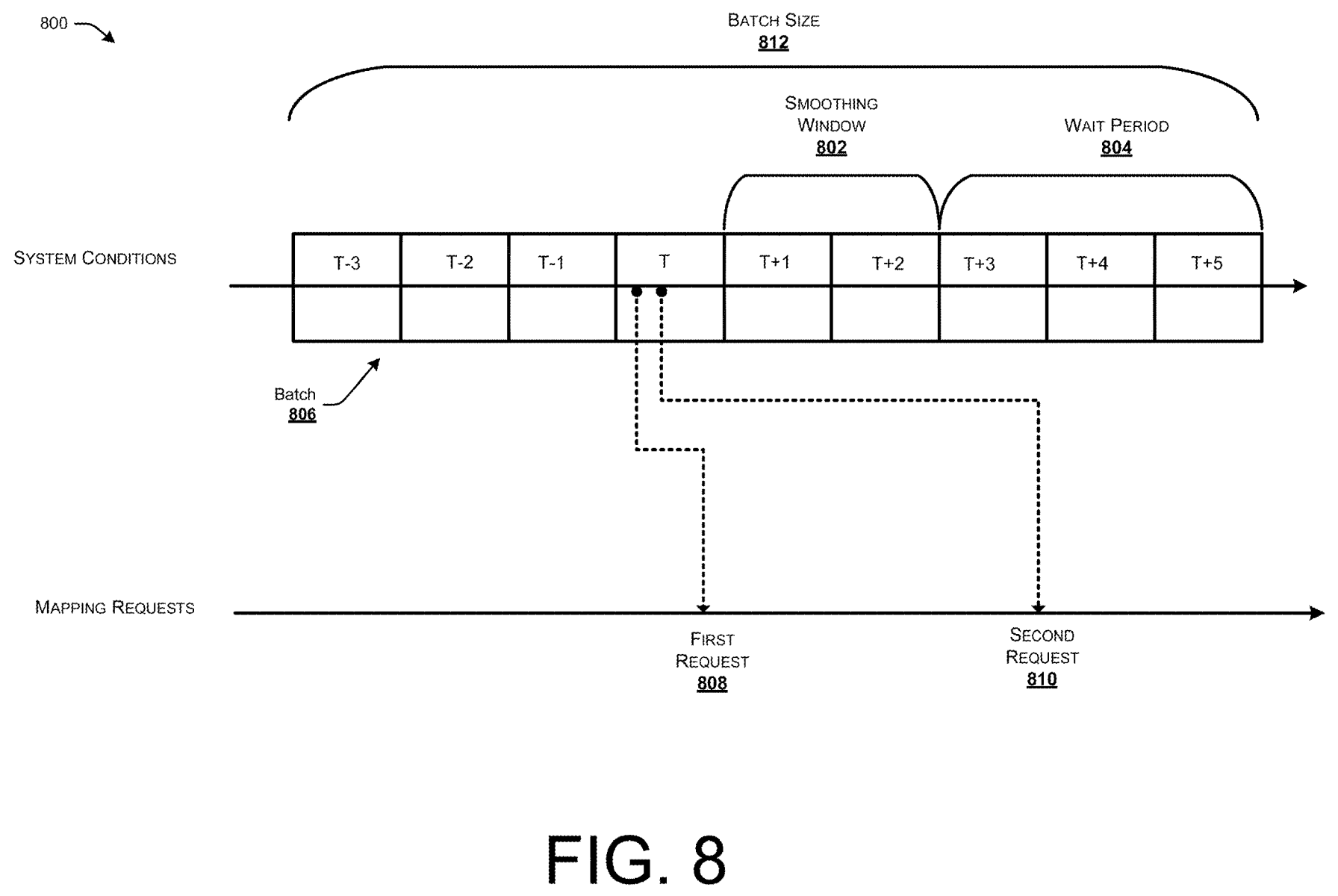

800

BATCH SIZE
812

SMOOTHING WINDOW
802

WAIT PERIOD
804

SYSTEM CONDITIONS

| T-3 | T-2 | T-1 | T | T+1 | T+2 | T+3 | T+4 | T+5 |
|-----|-----|-----|---|-----|-----|-----|-----|-----|

Batch
806

MAPPING REQUESTS

FIRST REQUEST
808

SECOND REQUEST
810

FIG. 8

NETWORK INTERFACE CONTROLLER 1012

INPUT/OUTPUT CONTROLLER 1016

CHIPSET 1006

CPU(S) 1004

RAM 1008

ROM 1010

STORAGE CONTROLLER 1014

COMPUTER-READABLE MEDIA 1018

OPERATING SYSTEM 1020

PROGRAMS 1022

BASEBOARD (MOTHERBOARD) 1002

COMPUTER 1000

TRACKING COMPUTER DEVICES IN EXTENDED DETECTION AND RESPONSE SYSTEMS

CROSS-REFERENCES TO RELATED APPLICATION(S)

This present application claims priority to U.S. Provisional Patent Application No. 63/461,379, titled "Asset Representation and Tracking for Extended Detection and Response (XDR) Systems," filed on Apr. 24, 2023, which is incorporated by reference herein in its entirety.

TECHNICAL FIELD

This present application pertains to the field of computer security and more specifically, to techniques for device tracking in extended detection and response systems.

BACKGROUND

Extended detection and response (XDR) systems are an emerging technology for advanced threat detection and security incident response. XDR platforms integrate data from the entire information technology (IT) infrastructure of a computing system to provide unified visibility and automated actions against cyberattacks.

A core challenge in XDR systems is correlating security events and identifying common assets across the various data sources ingested from different security monitoring tools. Endpoint detection and response (EDR) systems, intrusion detection systems (IDS), firewalls, email security platforms and more each use different schemes to identify assets like devices, users, and applications. For example, an EDR may utilize agent identifiers while an IDS may use internet protocol (IP) addresses for device identification.

This fragmentation means that, without effective translation and mapping capabilities, the XDR cannot establish connections between related events involving the same assets across different monitoring tools. However, accurate and efficient asset tracking is important for XDR systems to perform cross-domain data analytics, detect multi-stage attacks, and initiate appropriate incident response workflows.

Therefore, there is a need for novel techniques to enable reliable asset identification and monitoring within XDR platforms even in the face of heterogeneous and large-scale security data feeds. Robust asset tracking mechanisms are crucial for XDRs to realize their full potential in amplifying security operation center (SOC) capabilities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 5A-5G provide operational examples of generating global device identifiers for device identifier graphs.

FIG. 8 provides an operational example of determining a batch in response to a first request and a second request, both of which are associated with the same timestamp.

DESCRIPTION OF EXAMPLE EMBODIMENTS

Overview

Figure 1:
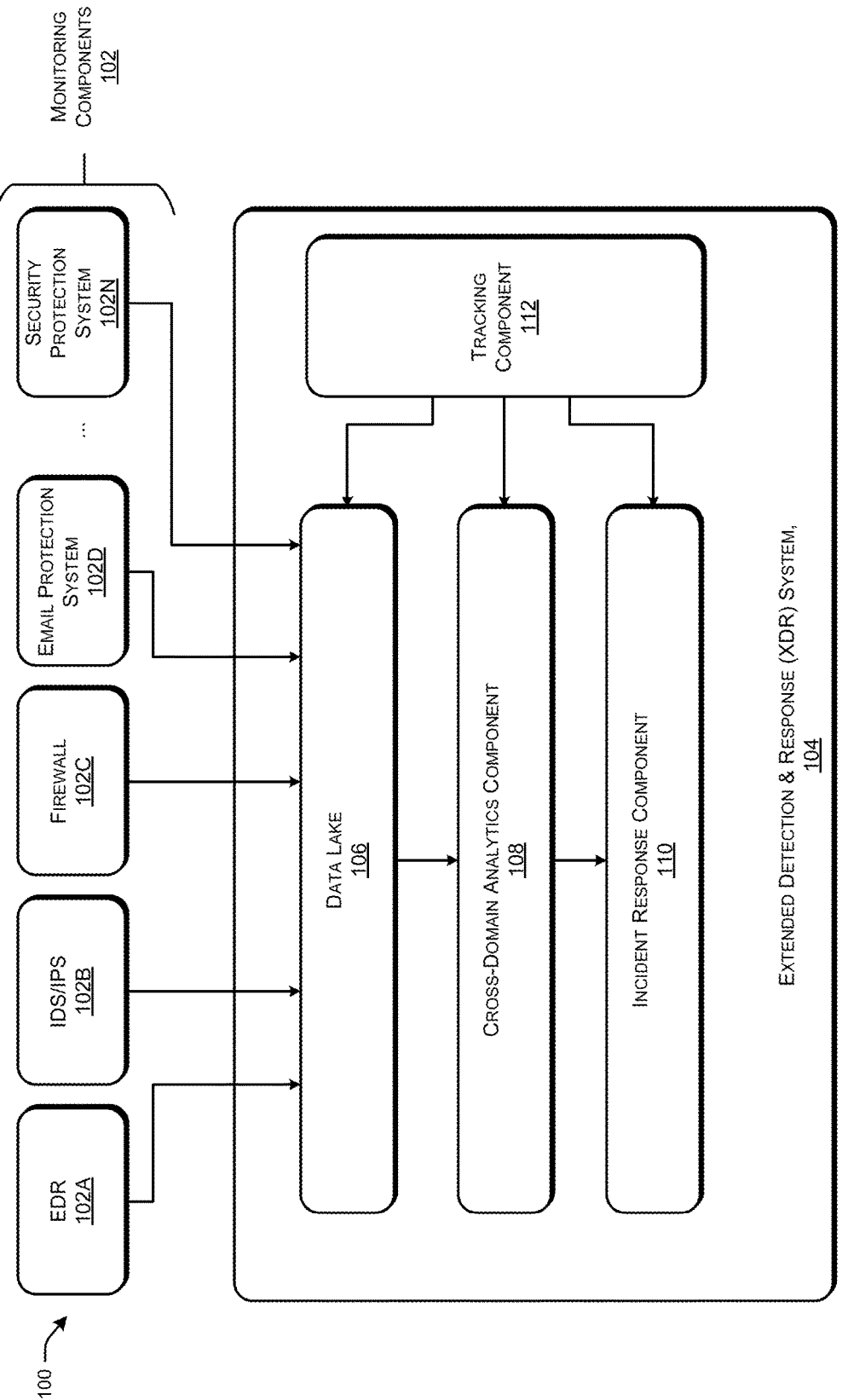
FIG. 1 depicts an environment with an Extended Detection and Response (XDR) system that interacts with a set of monitoring components.

This disclosure describes techniques for mapping local device identifiers used in monitoring data from different sources to a common global identifier to enable correlation of monitoring events related to the same device. In some cases, the techniques described herein relate to a method including receiving first monitoring data from a first computing entity, wherein the first monitoring data represents a first event determined by monitoring a computing device, and wherein the first monitoring data comprises a first identifier for the computing device. The method may further include receiving second monitoring data from a second computing entity, wherein the second monitoring data represents a second event determined by monitoring the computing device, and wherein the second monitoring data comprises a second identifier for the computing device. The method may further include determining, based on mapping data, that both the first identifier and the second identifier map to a common global identifier for the computing device. The method may further include, based on determining that both the first identifier and the second identifier map to the common global identifier, providing first feedback data to the first computing entity, wherein the first feedback data represents that the first identifier and the second identifier relate to the common global identifier.

In some cases, the techniques described herein relate to a method including receiving a first association graph representing links between nodes associated with computing device identifiers, wherein the nodes include a highest-order subset; determining that the highest-order subset comprises at least two nodes from nodes. The method may further include, for each of a first node and a second node from the nodes, determining one or more most-proximate nodes from the highest-order subset. The method may further include, based on determining that the one or more most-proximate nodes associated with the first node comprise a single highest-order node, assigning a first global device identifier associated with the single highest-order node to the first node. The method may further include, based on determining that the one or more most-proximate nodes associated with the second node comprise two or more highest-order nodes, assigning a second global device identifier to the second node, wherein the second global device identifier is distinct from global device identifiers assigned to the two or more highest-order nodes. The method may further include determining mapping data associated with the computing device identifiers based on the first global device identifier and the second global device identifier.

Additionally, the techniques described herein may be performed by a system and/or device having non-transitory computer-readable media storing computer-executable instructions that, when executed by one or more processors, performs the method described above.

Example Embodiments

This disclosure describes techniques for mapping local device identifiers used in monitoring data from different sources to a common global identifier to enable correlation of monitoring events related to the same device. The techniques can be used in the context of an Extended Detection and Response (XDR) system architecture for advanced threat detection and response in a computer system. In some cases, the XDR system ingests security data from various monitoring components like Endpoint Detection and Response (EDR), Intrusion Detection Systems (IDSs), Intrusion Prevention Systems (IPSs), firewall engines, and email security systems.

In some cases, each monitoring component generates events using local device identifiers specific to its domain. An EDR may use agent identifiers, user emails, or usernames to identify devices. An IDS/UPS may use Internet Protocol (IP) addresses, Media Access Control (MAC) addresses or hostnames. A firewall engine may use IP addresses or user information for device identification. An email security system may use email addresses. A key challenge is associating events and identifiers across domains for the same device. In some cases, a tracking component maps local device identifiers to global identifiers used within the XDR. These mappings may be stored in a database and provided using translation APIs.

In some cases, the techniques described herein relate to receiving first and second monitoring data representing events detected on a computing device, where the data come from different monitoring components and uses different local identifiers for the device. If the system determines both identifiers map to a common global identifier, the system provides feedback to the monitoring components enabling them to associate their respective events with the common identifier. The system can also provide global identifier mapping to components that store the monitoring data to enable retrieval using the common identifier, perform security analytics, or initiate responsive actions.

In some cases, the techniques described herein relate to determining global identifiers by analyzing associations between device identifiers and assigning global identifiers based on proximity to highest-order identifiers in an association graph. Global identifiers can be assigned when proximal to one highest order identifier or new global identifiers assigned when proximal to multiple. The system may perform preprocessing operations to build associations and determine highest order identifiers, and then perform periodic inference phases to assign global identifiers.

In some cases, the techniques described herein relate to processing monitoring data asynchronously by waiting for a threshold period to collect all data related to a time period, then determining a consolidated device identifier for that batch of data. Smoothing windows are used to assemble related data across time batches. The system may provide the mapped global identifier back to a monitoring component after the async threshold period.

In some cases, the techniques described herein relate to a mapping engine for determining associations between local device identifiers from different monitoring tools and the global identifiers used within the XDR system. The mapping engine may apply various techniques like rules, heuristics, and machine learning models to analyze asset attributes in events and predict identifier mappings. By continuously learning from new data, the mapping engine can adapt its mapping logic to changing environments. The mapping engine may use optimized data processing platforms for efficient analytics computations.

In some cases, to balance performance and completeness, mappings are stored in two separate data stores: a fast in-memory cache for recent mappings, and a distributed database for historic mappings. Segregating in this way allows fast lookup of common mappings while still providing comprehensive coverage. Mappings are transferred from recent to historic store based on age and access patterns. This hybrid approach delivers low latency, high capacity, and optimized identifier translation.

In some cases, a device identifier mapping algorithm allocates nodes in a device identifier graph to sets centered around high-reliability nodes like IP addresses. In some cases, this algorithm recursively expands the sets by symmetric distance until no conflicts remain. Conflicting nodes are assigned their own global identifier. This technique provides computationally efficient identifier grouping and global identifier assignment at scale.

In some cases, to handle delayed data, mapping requests wait for a smoothing window before compiling a batch. All data associated with the time period is included before determining the global identifier. Smoothing windows across batches improves accuracy. Batching limits the impact of asynchronous data while providing consolidated device IDs required for effective XDR analytics and response.

In some cases, the techniques described herein improve computational efficiency of device identifier mapping. For example, the graph-based recursive set expansion technique for assigning global identifiers provides significant improvements in computation efficiency compared to pairwise comparison or linear search approaches. By leveraging graph topology and expanding from high-order nodes, global identifiers can be rapidly assigned for large datasets.

In some cases, the techniques described herein enable optimized storage infrastructure for storing device identifier mapping data. For example, the techniques described herein enable a two-tier mapping data storage approach minimizes latency by putting common mappings in fast in-memory caches while also providing comprehensive coverage through a distributed database. This optimized design reduces storage costs while delivering the performance needed for real-time ID mapping.

In some cases, the techniques described herein enable increased accuracy of device identifier mapping through batch-based asynchronous mapping. Temporally grouping data into batches aligned to specific time periods provides greater mapping accuracy compared to processing events independently. Smoothing windows further improve accuracy across batches. This technique enhances reliability despite asynchronous data feeds.

In some cases, the techniques described herein provide computational, storage, scalability and accuracy improvements that enable XDR systems to perform robust and reliable asset tracking across huge volumes of heterogeneous security data for enhanced threat detection and response. Accordingly, the techniques described herein provide practical solutions to key technical challenges in this domain.

FIG. 1 depicts an environment 100 with an Extended Detection and Response (XDR) system 104 that interacts with a set of monitoring components 102, such as an EDR system 102A, an Intrusion Detection System (IDS)/Intrusion Prevention System (IPS) 102B, a firewall engine 102C, an email protection system 102D, and other security protection systems 102N.

The EDR system 102A may monitor activity on endpoints such as servers, desktops, and laptops. The EDR system 102A may generate monitoring events for suspicious or malicious activity observed on endpoints. The EDR system 102A may be implemented as agent software installed on each endpoint. The agent operates in the background, continuously collecting endpoint telemetry data and sending it to a central management console and/or the XDR system 104. The EDR agent can employ various techniques to detect threats, such as signature-based detection, behavioral analysis, and machine learning algorithms. Signature-based detection involves comparing observed activities against known patterns of malicious behavior or attack signatures. Behavioral analysis identifies anomalies or deviations from normal endpoint behavior which might indicate a potential threat. Machine learning algorithms can enhance detection capabilities by learning from historical data and adapting to new and emerging threats.

The IDS/IPS 102B may monitor network activity by analyzing network traffic. The IDS/IPS 102B may generate monitoring events for anomalous network traffic or known attack patterns. To achieve its monitoring and detection capabilities, the IDS/IPS 102B may use a combination of techniques, including signature-based detection, anomaly detection, and heuristic analysis. Signature-based detection involves comparing network traffic against a database of known attack signatures or patterns. Anomaly detection focuses on identifying deviations from normal network behavior, which could indicate possible intrusions or suspicious activities. Heuristic analysis involves applying predefined rules and behavioral models to detect unknown or emerging threats. In some cases, the IDS/IPS 102B performs at least one of an IDS or an IPS functionality. The IDS functionality may identify suspicious or anomalous network behaviors, such as port scans, unusual data transfer patterns, or unauthorized access attempts. The IPS functionality may take immediate action to block or prevent identified threats from progressing further into the network.

The IDS/IPS 102B may be implemented as a hardware or virtual network appliance deployed on the network. For example, the IDS/IPS 102B can be realized as a hardware appliance installed at strategic points within the network infrastructure. Alternatively, the IDS/IPS 102B may be deployed as a virtual network appliance running on virtualized servers or cloud-based instances.

The firewall engine 102C may filter incoming and outgoing network traffic according to configured rules. The firewall engine 102C may generate monitoring events when traffic is blocked or allowed. In some cases, the firewall engine 102C operates as a barrier between the internal network and the external world, controlling the flow of network traffic based on predefined rules. In some cases, the firewall engine 102C is configured to filter incoming and outgoing network traffic to enforce security policies and protect the organization's assets from unauthorized access, data exfiltration, and potential threats.

In some cases, when network packets arrive at the firewall, they are inspected against a set of configured rules and policies. These rules can be based on various criteria, such as source and destination IP addresses, port numbers, application protocols, or specific content within the packets. If a packet matches an allow rule, the firewall engine 102C permits it to pass through to its intended destination. On the other hand, if the packet matches a deny rule, the firewall engine blocks it, preventing unauthorized access or potentially malicious traffic from entering or leaving the network.

The firewall engine 102C may be implemented as a hardware or virtual network appliance. Hardware-based solutions may offer dedicated processing power for packet inspection, making them suitable for high-performance network environments where low latency is crucial. Virtual network appliances, running on virtualized servers or cloud instances, may provide flexibility and ease of management, making them ideal for dynamic and rapidly changing network infrastructures.

The email protection system 102D may scan incoming and outgoing emails for malware and spam. The email protection system 102D may generate monitoring events for blocked or allowed emails. The email protection system 102D may be implemented as a software service integrated with email servers. In some cases, the email protection system 102D continually evaluates the content, attachments, and/or sender reputation of incoming emails. To do so, the email protection system 102D may use databases of known threat signatures to identify and block emails that exhibit malicious behavior or contain harmful content. In some cases, the email protection system 102D scrutinizes outgoing emails to ensure that they do not inadvertently transmit sensitive information or include suspicious links or attachments. In some cases, whenever the email protection system 102D identifies a potentially malicious or spam email, the email protection system 102D generates monitoring events to record the incident. These monitoring events can include details such as the sender's information, recipient details, timestamp, and/or a description of the threat or spam category.

Additional security protection systems 102N may provide other types of security monitoring and generate associated monitoring events. Examples of such additional security protection systems 102N include Web Application Firewalls (WAFs), Data Loss Prevention (DLP) systems, Network Access Control (NAC) systems, threat intelligence platforms, advanced threat detection systems, Security Information and Event Management (SIEM) systems, vulnerability management systems, and Endpoint Protection Platforms (EPPs). The additional security protection systems 102N may generate monitoring events that contribute to a comprehensive security posture to enable organizations to detect and respond to cyber threats. In some cases, integration of the additional security protection systems 102N with the XDR system 104 and other security components allows for centralized management, correlation of security data, and streamlined incident response efforts.

In some cases, each monitoring component 102 provides monitoring events that identify devices using a set of device identifiers that are local to that monitoring component. These "local device identifiers" may be distinct from the device identifiers used by other monitoring components. For example, the EDR system 102A may identify a device using an agent identifier (ID) assigned to the EDR agent software installed on that device, the username of the user logged into the device, the email address associated with the user account on the device, or other identifiers that are specific to the EDR system 102A. The IDS/IPS 102B may identify devices by their Internet Protocol (IP) address on the monitored network, Media Access Control (MAC) address, hostname, or other network-specific identifiers. The firewall engine 102C may identify devices by IP address, MAC address, or hostname if doing L2/L3 monitoring, or may identify devices by user if doing L7 application monitoring. The email protection system 102D may identify devices by the email address associated with the user account that is sending or receiving emails from that device.

Other monitoring components may use local identifiers like process name, database credentials, application usernames, or other identifiers specific to that monitoring domain. For example, WAFs may identify devices based on the session token or user account associated with web application interactions. As another example, DLP systems may identify devices based on user login credentials, file names, or file metadata. As yet another example, NAC systems may identify devices based on their MAC address or authenticated user credentials. As an additional example, advanced threat detection systems employ a combination of behavioral patterns, IP addresses, and user behavior to identify devices exhibiting suspicious activities.

The XDR system 104 may include a data lake 106 that receives and stores the monitoring events generated by the monitoring components 102. The data lake 106 may operate as a central hub for collecting, storing, and analyzing the monitoring events generated by the various monitoring components 102. The data lake 106 may receive the monitoring events in real-time from the monitoring components 102, storing them in a structured or semi-structured format for efficient retrieval and analysis. The data lake 106 may be implemented using a database, data warehouse, and/or cloud storage. If implemented as a database, the data lake 106 might utilize NoSQL databases like Apache Cassandra or MongoDB, providing horizontal scaling capabilities to handle large volumes of data. A data warehouse approach might use solutions like Amazon Redshift or Google Big-Query to enable complex analytics and reporting on historical data. Alternatively, cloud-based object storage services like Amazon S3 or Microsoft Azure Blob Storage might be utilized.

The XDR system 104 may also include a cross-domain analytics component 108 that retrieves monitoring events from the data lake 106 and performs cross-domain data analytics to detect security threats. The analytics may involve correlating events reported by the monitoring components 102 to detect security incidents. By analyzing and correlating data from various sources, such as EDR system 102A, IDS/IPS 102B, firewall engine 102C, email protection system 102D, and other security protection systems 102N, the cross-domain analytics component 108 can identify patterns and anomalies that might indicate potential security breaches or malicious activities. For example, the component may correlate an EDR system event indicating a suspicious file modification with an IDS/IPS event reporting unusual network traffic associated with the same endpoint. This correlation might suggest a potential ransomware attack or unauthorized data exfiltration. Similarly, the component may analyze email protection system events that detect phishing attempts and cross-reference them with the IDS/IPS events capturing network connections to known malicious domains to discover a sophisticated email-borne threat campaign.

The cross-domain analytics component 108 may be implemented using data analytics and machine learning platforms. Data analytics platforms may offer powerful data processing capabilities to analyze large-scale datasets and perform complex data transformations. Technologies like Apache Spark, Hadoop, and Elasticsearch may be used for distributed data processing and storage to enable the cross-domain analytics component 108 to handle the high volume and variety of security data generated by the monitoring components. In some cases, the cross-domain analytics component 108 can utilize machine learning algorithms to continuously improve its correlation and threat detection capabilities. Machine learning models can learn from historical data, identify evolving attack patterns, and adapt to new and emerging threats.

The XDR system 104 may also include an incident response component 110 that initiates automated or manual responses to security incidents detected by the cross-domain analytics component 108. Responses may include isolating affected endpoints, blocking IP addresses, or notifying security teams. The incident response component 110 may integrate with security workflows. To streamline and optimize incident response efforts, the incident response component 110 may integrate with the Security Information and Event Management (SIEM) systems, ticketing systems, or other incident response platforms.

In some cases, when the cross-domain analytics component 108 identifies a security incident, the incident response component 110 is triggered to initiate appropriate responses. These responses can be automated, where predefined response actions are executed based on predefined playbooks and policies, or manual, where security analysts are involved in making informed decisions on response actions based on the severity and nature of the incident. Automated responses may involve isolating affected endpoints or devices from the network to prevent lateral movement of threats and contain the spread of malware. The incident response component 110 can use network access control (NAC) systems or firewall rules to implement these isolation measures. Furthermore, the incident response component 110 may take automated actions to block or blacklist malicious IP addresses or domains associated with the detected threats. In the case of sophisticated threats that require a deeper investigation or involve critical assets, the incident response component 110 may trigger manual responses. Security analysts can investigate the incident further, gather additional context, and collaborate to devise and execute appropriate remediation actions. Additionally, the incident response component 110 may alert security teams and relevant stakeholders when a security incident is detected. These notifications can be in the form of email alerts, ticketing system integrations, or other communication channels to ensure timely attention and action.

The XDR system 104 may also include a tracking component 112 that maps local device identifiers used in monitoring events to global device identifiers used within the XDR system 104. In some cases, tracking component 112 handles mapping these disparate local device identifiers from each monitoring component 102 to the global device identifiers used within the XDR system 104 for unified tracking and analytics. As the monitoring components 102 generate monitoring events with their specific local device identifiers, they may lack a standardized format or uniqueness across the organization. For instance, an endpoint device might be identified differently by the EDR system 102A using its agent identifier, while the IDS/IPS 102B uses the device's IP address, and the email protection system 102D references the device through its associated email account. To create a cohesive view of the security landscape, the tracking component 112 bridges these differences by associating each local device identifier with a corresponding global device identifier used within the XDR system 104. This global device identifier may operate as a common reference point that enables the XDR system to consolidate and correlate security data from multiple sources effectively.

In some cases, the local device identifiers used by different monitoring components 102 may refer to the same device. However, the disparity between the local identifiers makes it difficult to associate all the monitoring events related to a given device across the different data sources. The tracking component 112 handles mapping these disparate local device identifiers from each monitoring component 102 to the global device identifiers used within the XDR system 104 for unified tracking and analytics. This allows the cross-domain analytics component 108 and incident response component 110 to correlate events and analyze activity associated with a device across endpoints, network, email, and other monitoring domains. The tracking component 112 may maintain mappings in a database and provide APIs for device identifier translation.

The tracking component 112 may translate between local device identifiers used in monitoring events and the global device identifiers used within the XDR system 104. The tracking component 112 can provide these identifier translations to the other components of the environment 100. For example, tracking component 112 may provide translations of global device identifiers to local device identifiers back to the monitoring components 102. This may enable the monitoring components 102 to enrich future monitoring events with global context received from the XDR system 104, thus avoiding the need for future mappings of local device identifiers by the tracking component 112. In some cases, when the tracking component 112 receives a security event that embeds a previously provided global device identifier (e.g., a previously provided global device identifier whose time-to-live (TTL) measure has not expired), the tracking component 112 can avoid mapping of local device identifiers provided in the event to global device identifiers because such global identifiers are already provided in the event itself. In some cases, when a monitoring component generates an event that includes a global device identifier already translated by the tracking component, there is no need for the tracking component to remap the local identifiers in that event. This optimization reduces computational overhead, streamlines the data processing pipeline, and ensures real-time responsiveness for incident detection and response. In some cases, the time-to-live (TTL) measure placed on previously provided global device identifiers allows the tracking component 112 to manage the relevance of mappings efficiently. By considering the TTL of global device identifiers, the tracking component can dynamically update or expire mappings to provide the monitoring components 102 and/or components of the XDR system 104 with reliable device identifier information.

Additionally, in some cases, when a monitoring component 102 receives data about mapping between its local device identifiers and other device identifiers from the tracking component 112, the monitoring component 102 gains the ability to detect more informative events while monitoring the devices' activities. This mapping data may enable the monitoring component 102 to establish connections and relationships between events that involve the same device, user, or entity, regardless of the specific local identifier used. In some cases, using device identifier mappings provided by the tracking component 112, a monitoring component 102 can contextualize security events and generate more comprehensive and informative alerts. For instance, when the EDR system 102A identifies a specific endpoint using its agent identifier and finds a corresponding mapping to the device's IP address used by the IDS/IPS 102B, it can combine these local identifiers to identify an endpoint-device relationship while monitoring a computing device. In some cases, an enhanced understanding of device identifier mappings across different domains allows a monitoring component 102 to detect complex attack patterns that span multiple areas of a security infrastructure.

In some cases, the tracking component 112 provides translations of local device identifiers to global device identifiers to the data lake 106 to enable the data lake 106 to store events consistently indexed by global device identifier. In some cases, when monitoring components 102 provide events to the data lake 106, the monitoring components 102 typically include local device identifiers specific to their domain. However, storing events in the data lake 106 indexed by local device identifiers may create challenges in correlating and retrieving information across different domains. This fragmented approach could hinder efficient cross-domain analytics and comprehensive threat detection. In some cases, to address this issue, the tracking component 112 bridges the gap by mapping the local device identifiers to their corresponding global device identifiers used within the XDR system 104. It then communicates this translated information to the data lake 106, allowing the data lake to index and store the events consistently using the globally recognized device identifiers. By leveraging global device identifiers for indexing, the data lake 106 can efficiently retrieve and present historical security events associated with specific devices or users across different domains. This capability enables security analysts to perform in-depth investigations and gain critical insights into the full scope of security incidents.

In some cases, the tracking component 112 provides device identifier mappings to the cross-domain analytics component 108 to enable the cross-domain analytics component 108 to correlate events associated with a device across different monitoring sources. In some cases, without the tracking component's translations of device identifiers across domain, the cross-domain analytics component 108 would face challenges in connecting local device identifiers and understanding the relationships between events involving the same device. However, the tracking component 112 bridges this gap by maintaining a centralized record of device identifier mappings. When the cross-domain analytics component 108 requires correlation between events related to a particular device, it can access these mappings to find the corresponding global device identifier used within the XDR system 104. With access to the mapped global device identifiers, the cross-domain analytics component 108 can efficiently and accurately correlate events originating from different monitoring components that pertain to the same device. This correlation capability enables the cross-domain analytics component to identify patterns, trends, and behaviors associated with a device across various domains, leading to a more comprehensive understanding of the device's activities and potential security risks.

By leveraging the device identifier mappings, the cross-domain analytics component 108 can detect sophisticated attack campaigns that involve coordinated actions across multiple security domains. For example, the cross-domain analytics component can link events reported by the EDR system 102A. IDS/IPS 102B, email protection system 102D, and other security protection systems 102N to reveal a multi-stage attack targeting a specific device or user. Furthermore, this correlation capability empowers the cross-domain analytics component 108 to identify lateral movement of threats, where an attacker attempts to traverse the network by exploiting different entry points. By connecting related events through device identifier mappings, the cross-domain analytics component can provide early detection of lateral movement, enabling security teams to respond swiftly and contain the threat.

In some cases, the tracking component 112 provides device identifier mappings to the incident response component 110 to enable the incident response component 110 to take actions on the appropriate device when responding to a security incident. In some cases, when the incident response component 110 receives an alert or security event triggered by the cross-domain analytics component 108, the incident response component 110 needs to act swiftly and decisively to mitigate the impact of the security incident. However, to execute targeted responses effectively, the incident response component 110 should know precisely which device or user is involved in the incident. By using device identifier mappings provided by the tracking component, the incident response component 110 can initiate appropriate and tailored responses directly on the identified device. For example, if the cross-domain analytics component 108 raises an alert indicating potential malware activity associated with a specific local device identifier, the incident response component 110 can use the deice identifier mappings to identify device by its global identifiers before responding to the alert. Furthermore, the device identifier mappings provided by the tracking component 112 can streamline coordination between the incident response component 110 and the monitoring components 102. This collaboration may ensure that incident response actions are well-coordinated across different security domains.

Figure 2:
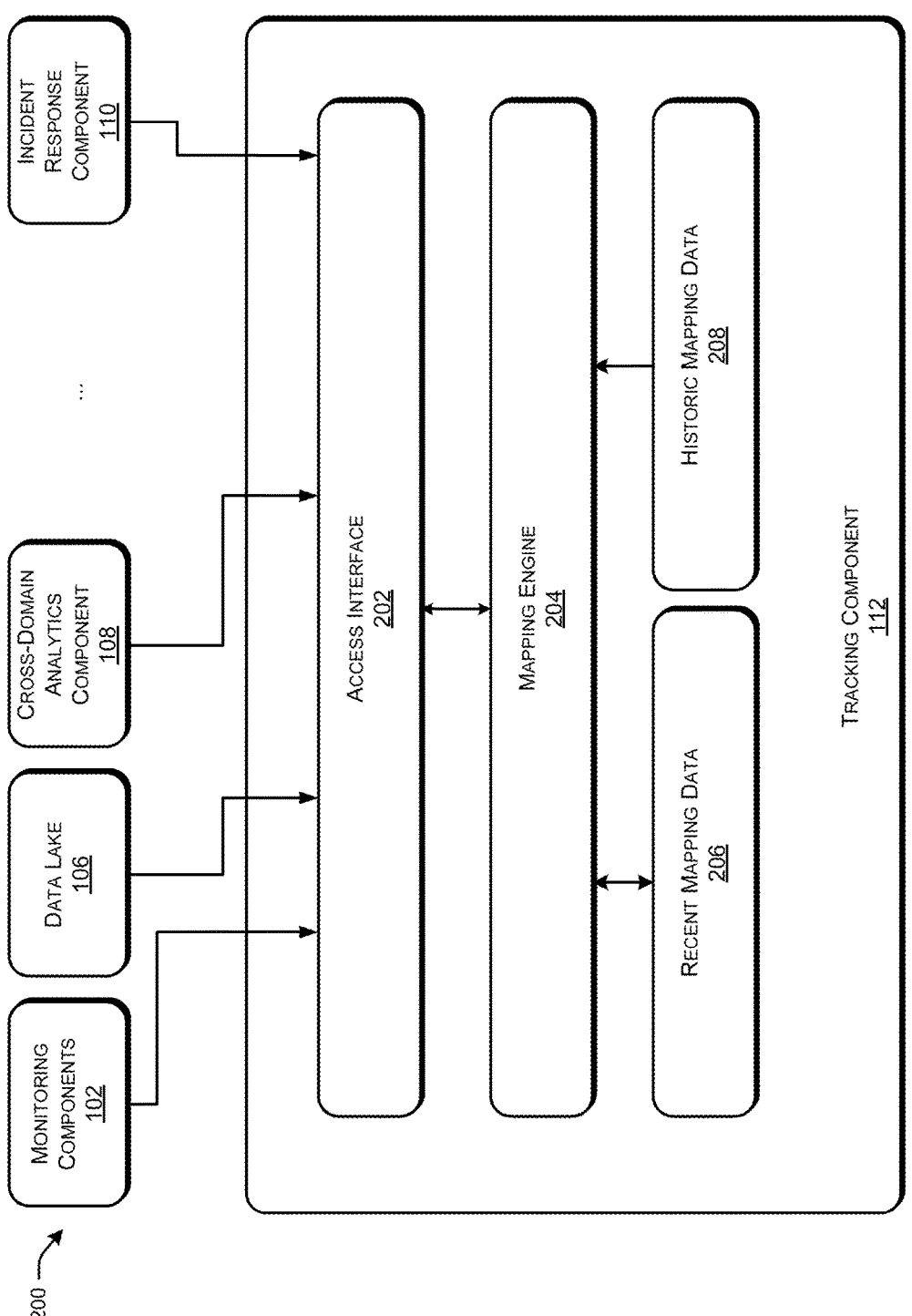
FIG. 2 depicts an example architecture for a tracking component of an XDR system.

FIG. 2 depicts an example architecture 200 for the tracking component 112 of the XDR system 104. As depicted in FIG. 2, the tracking component 112 includes an access interface 202 that receives security events from the monitoring component 102 and device identifier mapping requests from other devices/components, such as from the monitoring components 102, the data lake 106, the cross-domain analytics component 108, and/or the incident response component 110. The tracking component 112 also includes a mapping engine 204 that determines mappings across device identifiers (e.g., mappings of local device identifiers to global device identifiers and/or vice versa, mappings local device identifiers to other local device identifiers, etc.). The tracking component 112 also includes recent mapping data 206 and historic mapping data 208. In some cases, to determine a device identifier mapping, the tracking component 112 queries recent mapping data 206 and historic mapping data 208.

In some cases, after the tracking component 112 determines a device identifier mapping between a first device identifier and a second device identifier, the tracking component 112 stores the mapping in the recent mapping data 206 (e.g., a cache memory medium). In some cases, after a threshold period of time from storing the mapping on recent mapping data 206, the mapping is moved to historic mapping data 208. In some cases, after a threshold period of time from the last time that a mapping on recent mapping data 206 was the target of a query by the tracking component 112, the mapping is moved to historic mapping data 208.

In some cases, the access interface 202 of the tracking component 112 receives incoming security events from the monitoring components 102 and also handles requests for device identifier mappings from other XDR components. The access interface 202 may be implemented as a set of APIs and event ingestion services.

In some cases, the mapping engine 204 of the tracking component 112 determines mappings between local device identifiers and global device identifiers. The mapping engine 204 may also determine mappings between pairs of local device identifiers from different monitoring components 102. The mapping engine 204 may process asset attributes in security events to derive relationships between identifiers. To do so, the mapping engine 204 may apply rules, heuristics, and machine learning models to predict mappings. The mapping engine 204 may be implemented on a processing platform optimized for data analytics computations.

In some cases, the recent mapping data 206 stores the most recent device identifier mappings determined or queried by the mapping engine 204. Storing recent mappings in a fast cache improves performance for looking up frequently accessed mappings. The recent mapping data 206 may be implemented using an in-memory database or cache optimized for low-latency reads.

In some cases, the historic mapping data 208 stores older device identifier mappings that are still useful but queried less frequently. This provides the mapping engine 204 access to an expanded set of known mappings for enhanced coverage. The historic mapping data 208 may be implemented using a distributed database scaled for high storage capacity.

Figure 3:
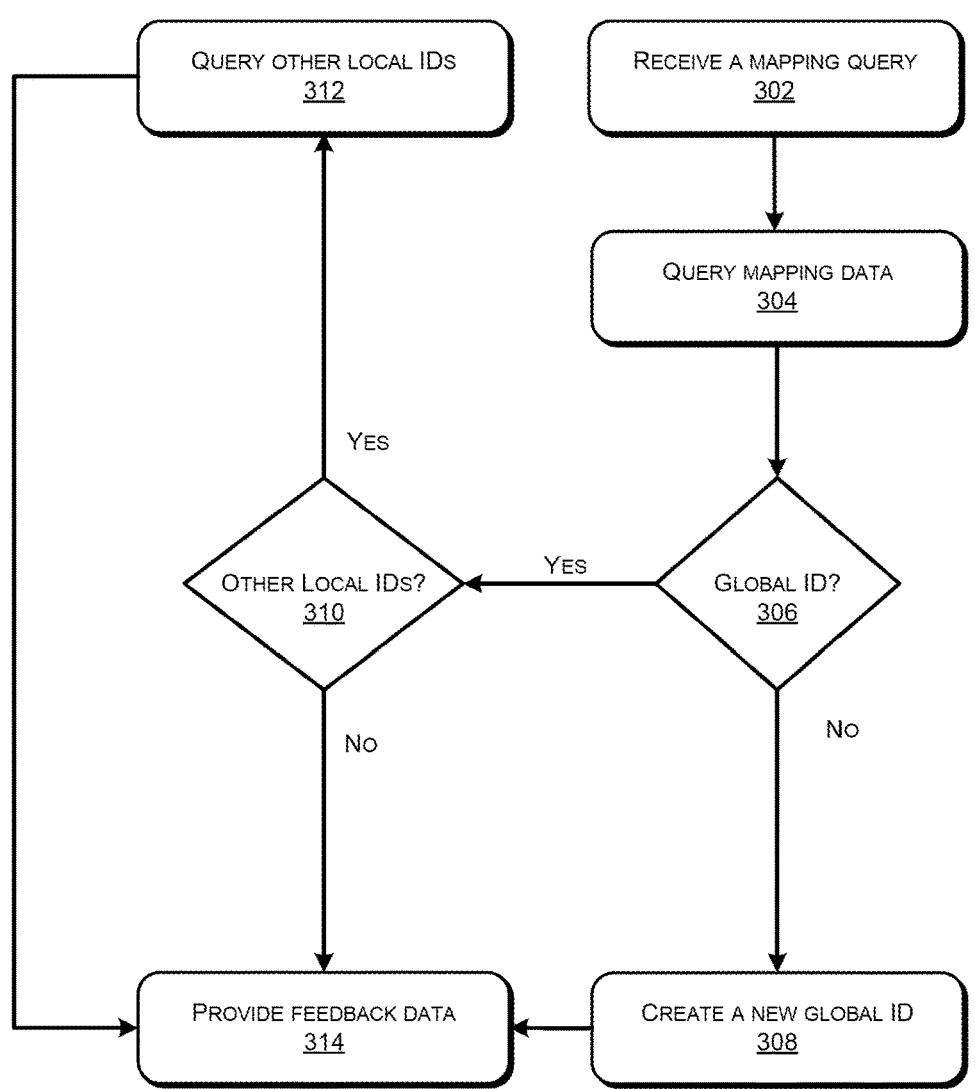
FIG. 3 is a flowchart diagram of an example process for providing feedback data regarding device identifier mappings to a requesting component.

FIG. 3 is a flowchart diagram of an example process 300 for providing feedback data regarding device identifier mappings to a requesting component (e.g., a monitoring component, a data lake, a cross-domain analytics component, an incident response comment, etc.). The process 300 may be performed by a tracking component, such as tracking component 112 of FIG. 1.

As depicted in FIG. 3, at operation 302, the process 300 includes receiving a mapping request associated with a first device identifier. The mapping request may be a request for mapping the first device identifier to one or more other device identifiers associated with the request.

At operation 304, the process 300 includes querying mapping data. In some cases, a tracking component queries to retrieve the corresponding device identifier mappings for the first device identifier received in the mapping request at operation 302. The tracking component may access its centralized mapping database, which contains a comprehensive record of local and global device identifier associations. During the querying process, the tracking component may cross-reference the received first device identifier with the stored mapping data to find its corresponding global device identifier used within the XDR system 104. Additionally, the tracking component may identify any other local device identifiers associated with the same device from different monitoring components 102.

At operation 306, the process 300 includes determining whether the query results received at operation 304 indicates that the first device identifier is associated with a global device identifier. If the query results indicate that the first device identifier is not associated with a global device identifier, then the process 300 includes (at operation 308) creating a new global device identifier for the first device identifier (e.g., setting the first device identifier as the global device identifier for the corresponding computing device) and (at operation 314) providing the new global device identifier as feedback data.

However, if the query results received at operation 304 indicate that the first device identifier is associated with a global device identifier, then the process 300 includes (at operation 310) determining whether the corresponding global device identifier is associated with any other local device identifiers. In some cases, a group of device identifiers that are mapped to the same device include a global device identifier and optionally a set of local device identifiers. If the global device identifier for the first device identifier is not associated with any existing local device identifiers, then the process 300 includes (at operation 314) providing the first device identifier and the corresponding global device identifier as feedback data. However, if the global device identifier for the first device identifier is associated with existing local device identifiers, then the process 300 includes (at operation 312) querying the existing local device identifiers and (at operation 314) providing the first device identifier, the corresponding global device identifier, and the queried existing local device identifiers as feedback data.

In some cases, if the query results received at operation 304 indicate that the first device identifier is associated with a global device identifier, then the process 300 includes adding the first device identifier as a new local device identifier for the global device identifier. In some cases, if the query results received at operation 304 indicate that the first device identifier is associated with a global device identifier, then the process 300 includes determining whether the first device identifier should become the new global device identifier and adding the first device identifier as a member of a device identifier set that includes the first device identifier and the existing global device identifier.

Figure 4:
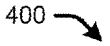
FIG. 4 is a flowchart diagram of an example process for determining one or more global device identifiers based on a device identifier graph.

FIG. 4 is a flowchart diagram of an example process 400 for determining one or more global device identifiers based on a device identifier graph. The process 400 may be performed by a tracking component, such as tracking component 112 of FIG. 1.

As depicted in FIG. 4, at operation 402, the process 400 includes receiving the device identifier graph. In some cases, each node of the device identifier graph represents a device identifier that is provided in a security event reported by a monitoring component. In some cases, each edge of the device identifier graph represents a relationship between two device identifiers, such as a relationship between two device identifiers as indicated by at least one security event reported by a monitoring component. For example, if a security event reported by a networking monitoring device indicates that a first IP address and a first MAC address are associated with the same device, then the device identifier graph may represent an edge between a first node corresponding to the first IP address and a second node corresponding to the first MAC address.

In some cases, to determine a device identifier graph, the system may receive data representing associations between a set of local device identifiers (e.g., associations indicated by security events reported by the monitoring components). In some cases, the system may determine one or more disjoint graphs based on the association data (e.g., one or more graphs without edges between them). Each disjoint graph may then be a device identifier graph with respect to which operations of the process 400 are performed. In some cases, generating device identifier graphs and identifying the highest-order node(s) of each graph is performed at a preprocessing phase that occurs before an inference phase in which the graphs and highest-order node identifications are used to determine global device identifiers (e.g., operation 402 may be performed in the preprocessing phase, while operations 404-416 may be performed in the inference phase). In some cases, the inference phase (e.g., operations 404-416) is periodically repeated.

At operation 404, the process 400 includes identifying a subset of nodes of the device identifier graph that have the highest order among the graph nodes. In some cases, the system configuration data defines a hierarchy of the identifier types that represents which identifier types have a higher order (e.g., are determined to have higher reliability) relative to others. For example, a hierarchy may describe that IP addresses are the highest-order identifier type, MAC addresses are the second-highest-order identifier type, and the like. In some cases, the highest-order nodes of a device identifier graph are a set of nodes whose respective identifier types have a higher or equal order with respect to identifier types of other nodes. For example, if IP addresses are the highest-order identifier type and MAC addresses are the second-highest-order identifier type, and if the device identifier graph includes IP address nodes, then those IP address nodes are the highest-order nodes. As another example, if IP addresses are the highest-order identifier type and MAC addresses are the second-highest-order identifier type, and if the device identifier graph does not include IP address nodes but includes MAC address nodes, then those MAC address nodes are the highest-order nodes. In some cases, a highest-order node is a node whose respective device identifier type is the highest-reliability identifier type among identifier types associated with the graph.

At operation 406, the process 400 includes determining whether the entire device identifier graph includes only one highest-order node. If so, then the process 400 includes (at operation 408) determining that all of the device identifiers associated with the nodes of the graph are part of the same set of identifiers and the set is associated with the device identifier of the highest-order node as its global device identifier. As another example, if IP addresses are the highest-order identifier type and MAC addresses are the second-highest-order identifier type, and if the device identifier graph includes a single IP address node, then the corresponding single IP address is the global device identifier for all of the device identifiers associated with nodes of the graph.

If the device identifier graph includes more than one highest-order node, then the process 400 includes (at operation 410) allocating each highest-order node to a respective identifier set. After that, at operation 412, the N identifier sets associated with the N highest-order nodes (where N>1) are symmetrically expanded to include nodes with incrementally larger distances from the highest-order node until either: (i) all nodes are allocated to a symmetrically-expanded identifier set and thus there are no "conflicting" nodes that can be allocated to more than one set based on the symmetric expansion logic (as determined in the No branch of operation 414), or (ii) there is at least one "conflicting" node that can be allocated to more than one set based on the symmetric expansion logic (as determined in the Yes branch of operation 414). If all nodes are allocated to a symmetrically-expanded identifier set (as determined in the No branch of operation 414), then the process 400 goes to operation 418 to assign each symmetrically-expanded set to the corresponding highest-order identifier in the set as the global device identifier for the set. If there is at least one "conflicting" node that can be allocated to more than one set based on the symmetric expansion logic (as determined in the Yes branch of operation 414), then the process 400 goes to operation 416 to assign conflicting nodes to new identifier sets and then proceeds to operation 418 to: (i) assign each symmetrically-expanded set to the respective highest-order identifier in the set as the global device identifier for the set, and (ii) assign each "new" identifier set corresponding to a conflicting identifier to the conflicting identifier as the global device identifier for the set.

For example, consider a device identifier graph in which a first node corresponding to IP address IP1 is connected to a second node corresponding to a MAC address MAC1, the second node is connected to a third node corresponding to a MAC address MAC2, and the third node is connected to a fourth node corresponding to IP address IP2. In this example, assuming IP addresses are the highest-order identifiers, two identifier sets are first initialized: one including IP1 and another including IP2. After a first symmetric expansion, the first set is expanded to include MAC1 which has a distance of one to IP1, and the second set is expanded to include MAC2 which has a distance of one to IP2. After this first expansion, all of the nodes belong to a symmetrically-expanded set. Thus, the process 400 arrives at operation 418 to assign the first set (i.e., IP1 and MAC1) to the corresponding highest-order identifier (IP1) as the global device identifier and the second set (i.e., IP2 and MAC2) to the corresponding highest-order identifier (IP2) as the global device identifier.

As another example, consider a device identifier graph in which a first node corresponding to IP address IP1 is connected to a second node corresponding to a MAC address MAC1, the second node is connected to a third node corresponding to email address EM1, the third node is connected to a fourth node corresponding to email address EM2, the fourth node is connected to a fifth node corresponding to a MAC address MAC2, and the fifth node is connected to a sixth node corresponding to the IP address IP2. In this example, assuming IP addresses are the highest-order identifiers, two identifier sets are first initialized: one including IP1 and another including IP2. After a first symmetric expansion, the first set is expanded to include MAC1 which has a distance of one to IP1, and the second set is expanded to include MAC2 which has a distance of one to IP2. After the second symmetric expansion, the first set is expanded to include EM1 which has a distance of two to IP1, and the second set is expanded to include EM2 which has a distance of TWO to IP2. After this second expansion, all of the nodes belong to a symmetrically-expanded set. Thus, the process 400 arrives at operation 418 to assign the first set (i.e., IP1, MAC1, and EM1) to the corresponding highest-order identifier (IP1) as the global device identifier and the second set (i.e., IP2, MAC2, and EM2) to the corresponding highest-order identifier (IP2) as the global device identifier.

As another example, consider a device identifier graph in which a first node corresponding to IP address IP1 is connected to a second node corresponding to a MAC address MAC1, the second node is connected to a third node corresponding to an email address EM1, the third node is connected to a fourth node corresponding to MAC address MAC2, and the fourth node is connected to a fifth node corresponding to IP address IP2. In this example, assuming IP addresses are the highest-order identifiers, two identifier sets are first initialized: one including IP1 and another including IP2. After a first symmetric expansion, the first set is expanded to include MAC1 which has a distance of one to IP1, and the second set is expanded to include MAC2 which has a distance of one to IP2. During the second symmetric expansion, the system detects that EM1 can be either part of the first set or the second set, because it has a distance of two from both IP1 and IP2. Accordingly, the process 400 may arrive at operation 418 to assign the first set (i.e., IP1 and MAC1) to the corresponding highest-order identifier (IP1) as the global device identifier, the second set (i.e., IP2 and MAC2) to the corresponding highest-order identifier (IP2) as the global device identifier, and a third set including EM1 with EM1 as its global device identifier.

As another example, consider a device identifier graph in which a first node corresponding to IP address IP1 is connected to a second node corresponding to a MAC address MAC1, the second node is connected to a third node corresponding to email address EM1, the third node is connected to a fourth node corresponding to email address EM2, the fourth node is connected to a fifth node corresponding to a MAC address MAC2, the fifth node is connected to a sixth node corresponding to the IP address IP2, and the second node and the fifth node are connected to a seventh node corresponding to email address EM2. In this example, assuming IP addresses are the highest-order identifiers, two identifier sets are first initialized: one including IP1 and another including IP2. After a first symmetric expansion, the first set is expanded to include MAC1 which has a distance of one to IP1, and the second set is expanded to include MAC2 which has a distance of one to IP2. During the second symmetric expansion, the system detects that EM1 can be either part of the first set or the second set, because it has a distance of two from both IP1 and IP2. Additionally, also during the second symmetric expansion, the system detects that EM2 can be either part of the first set or the second set, because it has a distance of two from both IP1 and IP2. Accordingly, the process 400 may arrive at operation 418 to assign the first set (i.e., IP1 and MAC1) to the corresponding highest-order identifier (IP1) as the global device identifier, the second set (i.e., IP2 and MAC2) to the corresponding highest-order identifier (IP2) as the global device identifier, a third set including EM1 with EM1 as its global device identifier, and a fourth set including EM2 with EM2 as its global device identifier.

Accordingly, to determine one or more global device identifiers based on a device identifier graph, the system may first receive the graph representing links between nodes associated with computing device identifiers, where the nodes include a highest-order subset. Afterward, the system may determine that the highest-order subset comprises at least two nodes from nodes. Then, for each node, the system may determine which highest-order nodes are most proximate to the respective node. If a respective node is most proximate to a single highest-order node, then the system may assign the device identifier associated with that single highest-order node to the respective node. If a respective node is most proximate to two or more single highest-order nodes, then the system may assign a device identifier distinct from the two or more highest-order nodes' device identifiers (e.g., the node's own device identifier) to the respective node.

FIGS. 5A-5G provide operational examples of generating global device identifiers for device identifier graphs. Each of FIGS. 5A-5G depicts a device identifier graph with one or more highest-order nodes. The highest-order nodes of each graph are indicated using dashed lines.

As depicted in FIG. 5A, the depicted graph includes a highest-order node G1 502(1), a node IP1 504(1), and a node U1 506(1). Because the graph depicted in FIG. 5A includes only one highest-order node, the entire graph is allocated to a single identifier set 500A including node G1 502(1), node IP1 504(1), and node U1 506(1). The global device identifier of the identifier set 500A may be the device identifier of the highest-order node G1 502(1).

As depicted in FIG. 5B, the depicted graph includes a highest-order node G2 502(2), a node IP2 504(2), a node U2 506(2), and a node U3 506(3). Because the graph depicted in FIG. 5B includes only one highest-order node, the entire graph is allocated to a single identifier set 500B including node G2 502(2), node IP2 504(2), node U2 506(2), and node U3 506(3). The global device identifier of the identifier set 500B may be the device identifier of the highest-order node G2 502(2).

As depicted in FIG. 5C, the depicted graph includes a highest-order node G3 502(3), a node IP3 504(3), a node IP4 504(4), a node U4 506(4), and a node U5 506(5). Because the graph depicted in FIG. 5C includes only one highest-order node, the entire graph is allocated to a single identifier set 500C including node G3 502(3), node IP3 504(3), node IP4 504(4), node U4 506(4), and node U5 506(5). The global device identifier of the identifier set 500C may be the device identifier of the highest-order node G3 502(3).

As depicted in FIG. 5D, the depicted graph includes a highest-order node G4 502(4), a node IP5 504(5), a node IP6 504(6), a node IP7 504(7), a node U6 506(6), and a node U7 506(7). Because the graph depicted in FIG. 5D includes only one highest-order node, the entire graph is allocated to a single identifier set 500D including node G4 502(4), node IP5 504(5), node IP6 504(6), node IP7 504(7), node U6 506(6), and node U7 506(7). The global device identifier of the identifier set 500D may be the device identifier of the highest-order node G4 502(4).

Figures 5E, 5F:
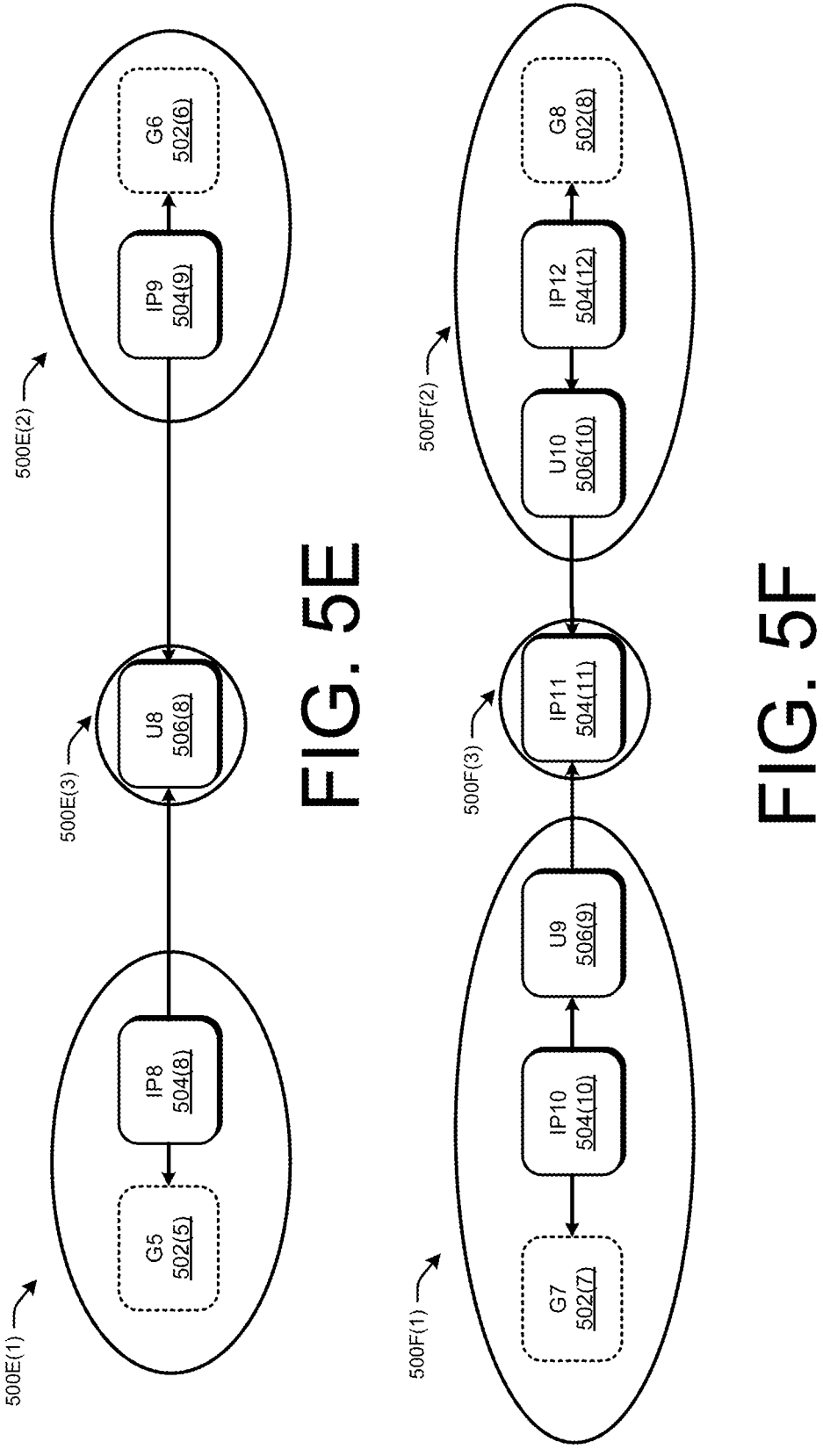

As depicted in FIG. 5E, the depicted graph includes two highest-order nodes G5 502(5) and G6 502(6). The depicted graph also includes a node IP8 504(8) whose most-proximate highest order node is G5 502(5) and a node IP9 504(9) whose most-proximate highest order node is G6 502(6). The depicted graph also includes a node U8 506(8) that is a conflicting node. Accordingly, the depicted graph includes three identifier sets: a first set 500E(1) with the highest-order node G5 502(5) and node IP8 504(8) whose global device identifier is the device identifier of the highest-order node G5 502(5), a second set 500E(2) with the highest-order node G6 502(6) and node IP9 504(9) whose global device identifier is the device identifier of the highest-order node G6 502(6), and a third set 500E(3) with the conflicting node U8 506(8) whose global device identifier is the device identifier of the conflicting node U8 506(8).

As depicted in FIG. 5F, the depicted graph includes two highest-order nodes G7 502(7) and G8 502(8). The depicted graph also includes a node IP10 504(10) whose most-proximate highest order node is G7 502(7), a node U9 506(9) whose most-proximate highest order node is G7 502(7), a node IP12 504(12) whose most-proximate highest order node is G8 502(8), and a node U10 506(10) whose most-proximate highest order node is G8 502(8). The depicted graph also includes a node IP11 504(11) that is a conflicting node. Accordingly, the depicted graph includes three identifier sets: a first set 500F(1) with the highest-order node G7 502(7), node IP10 504(10), and node U9 506(9); a second set 500F(2) with the highest-order node G8 502(8), node IP12 504(12), and node U10 506(10); and a third set 500F(3) with the conflicting node IP11 504(11) whose global device identifier is the device identifier of the conflicting node IP11 504(11).

Figure 5G:
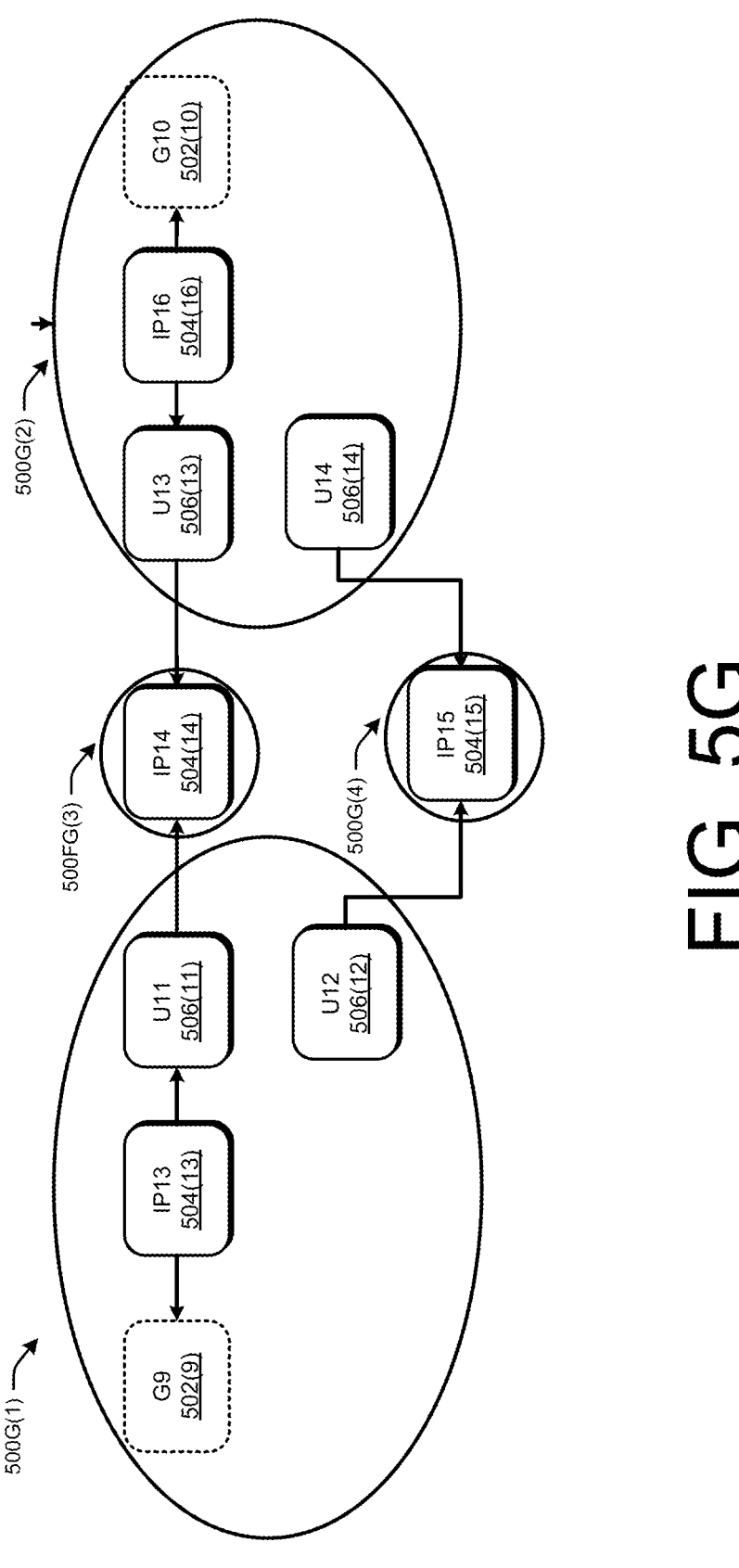

As depicted in FIG. 5G, the depicted graph includes two highest-order nodes G9 502(9) and G10 502(10). The depicted graph also includes a node IP13 504(13) whose most-proximate highest order node is G9 502(9), a node U11 506(11) whose most-proximate highest order node is G9 502(9), a node U12 506(12) whose most-proximate highest order node is G9 502(9), a node IP16 504(16) whose most-proximate highest order node is G10 502(10), a node U13 506(13) whose most-proximate highest order node is G10 502(10), and a node U14 506(14) whose most-proximate highest order node is G10 502(10). The depicted graph also includes a node IP11 504(11) and a node IP15 504(15) that are both conflicting nodes. Accordingly, the depicted graph includes four identifier sets: a first set 500G(1) with the highest-order node G9 502(9), node IP13 504(13), node U11 506(11), and node U12 506(12); a second set 500G(2) with the highest-order node G10 502(10), node IP16 504 (16), node U13 506(13), and node U14 506(14); a third set 500G(3) with the conflicting node IP14 504(14) whose global device identifier is the device identifier of the conflicting node IP14 504(14); and a fourth set 500G(4) with the conflicting node IP15 504(15) whose global device identifier is the device identifier of the conflicting node IP15 504(15).

Figure 6:
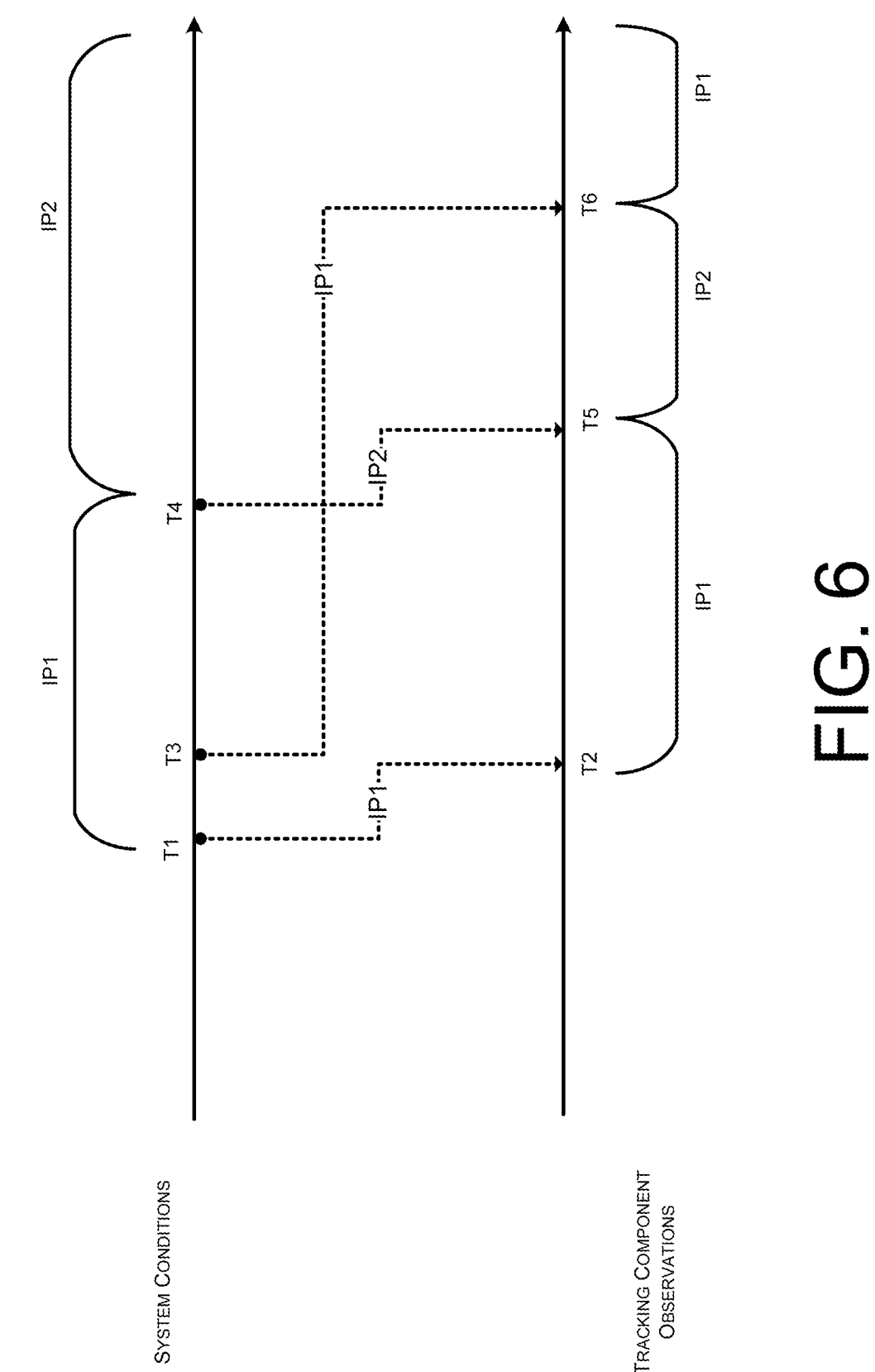
FIG. 6 provides an operational example of a mismatch of device identifiers that can happen when two or more monitoring components asynchronously report security events to a tracking component.

FIG. 6 provides an operational example 600 of a mismatch of device identifiers that can happen when two or more monitoring components asynchronously report security events to a tracking component, such as to tracking component 112 of FIG. 1. As depicted in FIG. 6, a first monitoring component reports, at a time T1, that the IP address of a device is IP1. This report is received by the tracking component at a time T2. Furthermore, a second monitoring component reports, at a time T3, that the IP address of the device is still IP1. This report, however, is received by the tracking component at a time T6 (where TM is later than TN if M>N). Moreover, a third monitoring component reports, at a time T4, that the IP address of the device is now IP2. This report is received by the tracking component at a time T5. Accordingly, even though the second monitoring component's report is associated with a time that precedes the timing associated with the third monitoring component's report, the latter report is received by the tracking component before the former report. Because of this temporal mismatch, the tracking component may determine that the device is associated with IP1 between T2 and T5, with IP2 between T5 and T6, and again with IP1 after T6. This contrasts with the actual system conditions, in which the device's IP address switches from IP1 to IP2 after T4.

Figure 7:
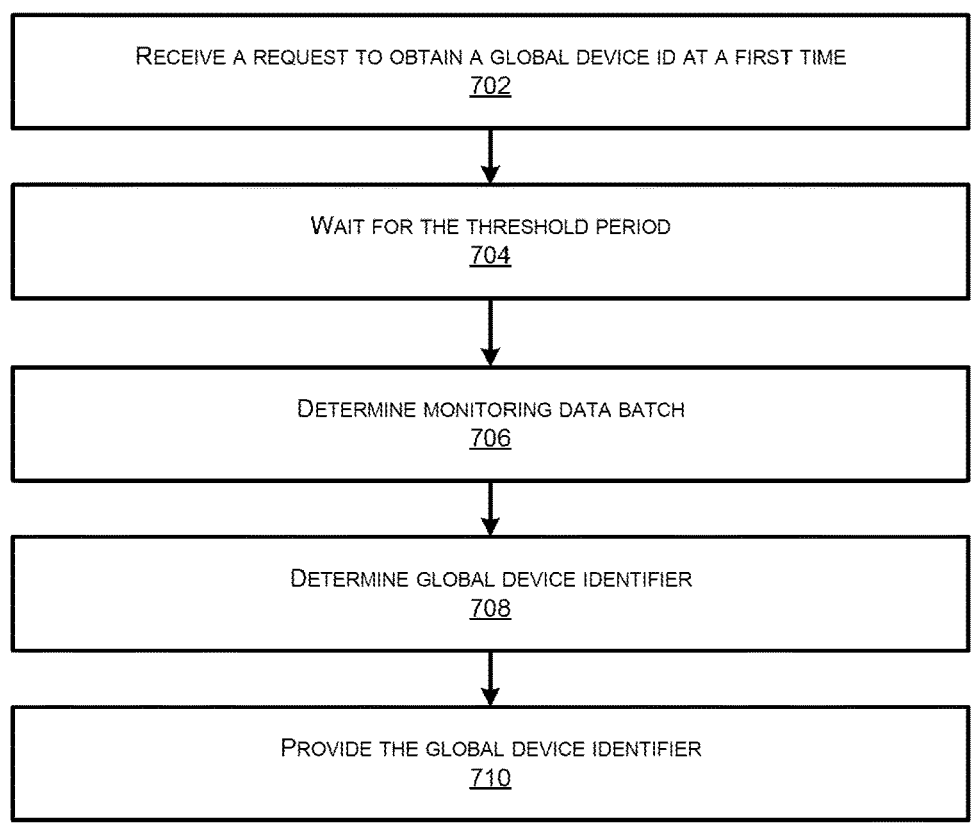
FIG. 7 is a flowchart diagram of an example process for mapping a local device identifier reported by a monitoring component to a global device identifier.

FIG. 7 is a flowchart diagram of an example process for mapping a local device identifier reported by a monitoring component to a global device identifier. The process 700 may be performed by a tracking component, such as tracking component 112 of FIG. 1.

As depicted in FIG. 7, at operation 702, the process 700 includes receiving a request to obtain a global device identifier for a first local device identifier. For example, the tracking component may receive a security event from a first monitoring component that includes the first local device identifier. The request may include an indication of a first time (e.g., a first time period), such as a time associated with generating the request and/or recording the corresponding security event. The first time may be the time associated with receiving the request.

At operation 704, the process 700 includes waiting for a threshold time period after the first time associated with the request. The threshold time period may include a required wait time and a number of timesteps associated with the size of a smoothing window of timesteps that includes the first time. For example, if the request is associated with a time T4 (e.g., includes a security event recorded at a time 4), and if the required wait time is four timesteps and the smoothing window for a timestep includes two timesteps after the respective timestep, then the system may wait until T4+6=T10. In this wait period, the system may continue to receive monitoring data and/or mapping requests from monitoring components. Accordingly, by waiting for the threshold time period, the system may receive monitoring data that is associated with (e.g., that is recorded at) a time before the first time but is received after the request and within the threshold period from the receipt time of the request.

At operation 706, the process 700 includes determining a monitoring data batch after the threshold time period expires. The monitoring data batch includes all monitoring data received before the batch determination that are associated with times that fall within a batch scope of the first time. The batch scope may be defined by two parameters: the threshold time period size that defines how many timesteps after the first time are included in the batch, and a batch size that defines how many timesteps before the first time are included in the batch.

For example, if a request is associated with a time T4, the threshold time period includes six timesteps, and the batch size is five timesteps, then the batch is generated after T10 and includes monitoring data associated with (e.g., recorded at) times T1-T10 (i.e., six timesteps after T4 and 5−2=3 timesteps before T4). This means that if the monitoring data associated with time T3 is received before time T10, it is included in the monitoring data batch. However, then the monitoring data associated with time T3 is received after time T10, then the monitoring data is not included in the monitoring data batch.

At operation 708, the process 700 includes determining a global device identifier for the first local device identifier based on the monitoring data batch. In some cases, this operation may involve applying a mapping algorithm or logic to the collected monitoring data within the batch scope to determine the corresponding global device identifier. The mapping algorithm could be designed to analyze various features or characteristics of the monitoring data and match them against known patterns or references in a mapping database.

For example, the mapping algorithm might take into account parameters such as the network activity, device behavior, communication patterns, or any unique identifiers available within the monitoring data batch. By examining these parameters, the system can attempt to recognize patterns that are consistent with known devices or device types. This recognition process can help establish a correlation between the local device identifier received in the request and a corresponding global device identifier present in the mapping database.

In some cases, operation 708 includes associating the determined global device identifier with the first local device identifier and recording this association in the system's database or memory. This association allows the system to quickly and accurately identify the global device identifier whenever a request with the same local device identifier is received in the future. Subsequently, the system can readily access information related to the corresponding global device identifier, such as device specifications, ownership details, location, or any relevant security events associated with that device.

At operation 710, the process 700 includes providing the global device identifier to the requesting device. In some cases, after receiving the request, the system provides a retry request to the request device indicating that the device should retry obtaining the global device identifier after the threshold time period. In some cases, after the threshold time period, the request device generates a new request and in response obtains the global device identifier, as determined based on the monitoring data batch. In some cases, the requesting device is a cross-domain analytics device that is configured to determine a security prediction associated with the computing device based on the first monitoring data. In some cases, the requesting device is a security response device that is configured to perform a responsive operation in relation to the computing device based on the first monitoring data.

FIG. 8 provides an operational example 800 of determining a batch 806 in response to a first request 808 and a second request 810, both of which are associated with a time T. As depicted in FIG. 8, the batch 806 includes received data associated with 5 timesteps after T, based on a smoothing window 802 of two and a wait period 804 of three. Moreover, the batch 806 includes three timesteps before T, based on a batch size 812 of nine (i.e., as 9−(3+2+1)=3).

Figure 9:
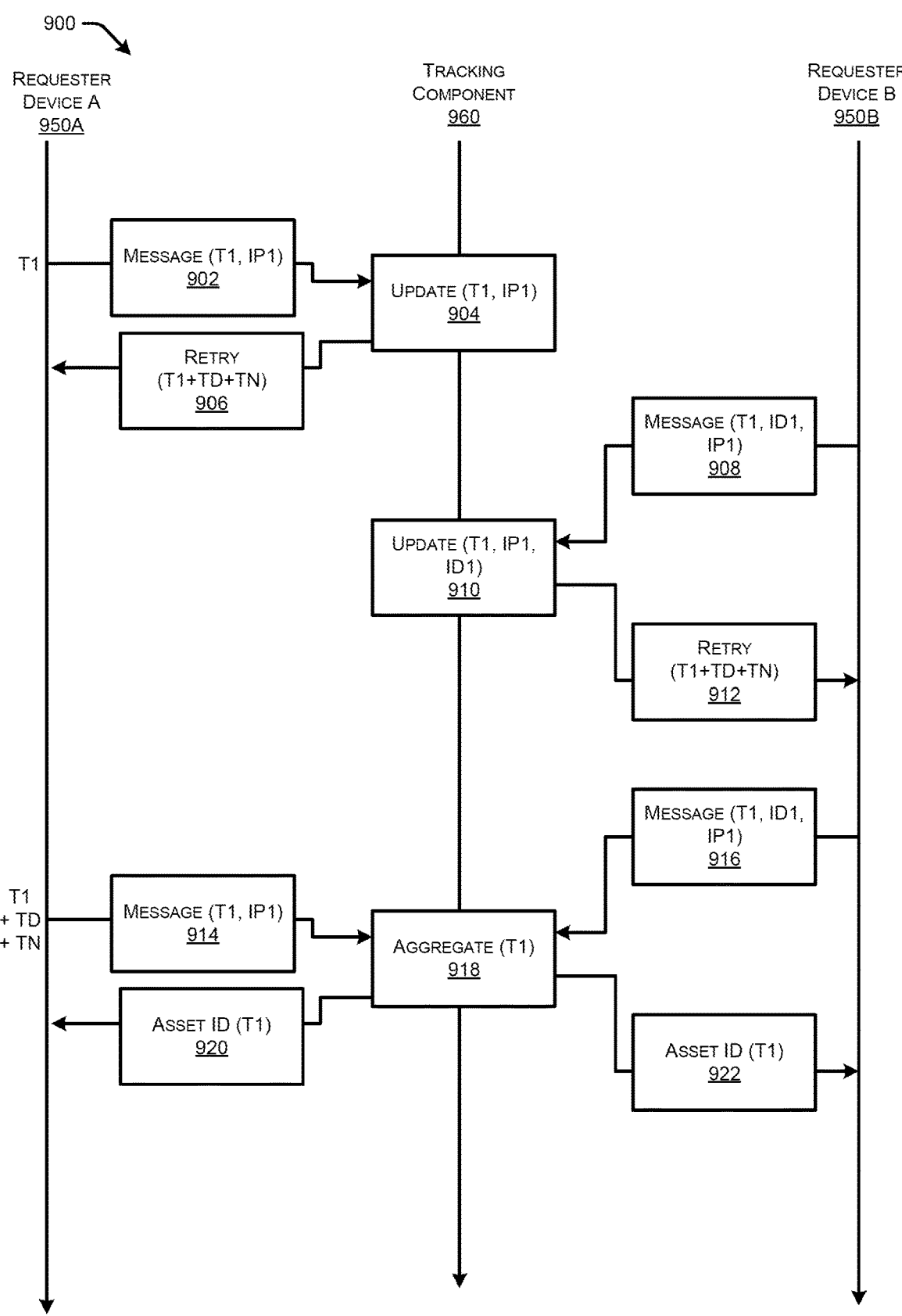
FIG. 9 provides a data flow diagram of an example process 900 providing global device identifiers in response to two requesting devices.

FIG. 9 provides a data flow diagram of an example process 900 for providing global device identifiers in response to two requesting devices (e.g., two monitoring components): requester device A 950A and requester device B 950B. As depicted in FIG. 9, both requester device A 950A and requester device B 950B provide (at operation 902 and operation 908 respectively) mapping requests associated with a time T1. The mapping request received from requester device A 950A (as received at operation 902) indicates time T1 and a device identifier IP1. The mapping request received from requester device B 950B (as received at operation 90B) indicates time T1 and a device identifiers IP1 and ID1. At operation 904, the tracking component 960 receives the request from requester device A 950A and updates the identifier set for the corresponding device to add IP1. At operation 906, the tracking component 960 requests that requester device A 950A retries its mapping request at a time T1+TD+TN, where TD is a required wait period and TN is determined by a smoothing window size.

At operation 910, the tracking component 960 receives the request from requester device B 950B and updates the identifier set for the corresponding device to maintain IP1 and add ID1. At operation 912, the tracking component 960 requests that requester device B 950B retries its mapping request at a time T1+TD+TN. Because both the mapping request received from requester device A 950A and the mapping request received from requester device B 950B are associated with (e.g., recorded at) time T, and because the smoothing window size and required wait period are in this example assumed to be the assume, the retrial times provided to both requester devices is the same time.

At operation 914 and operation 916, the tracking component 960 receives the retrial requests from requester device A 950A and requester device B 950B respectively. At operation 918, the tracking component 960 computes the global device identifier for the respective device associated with time T1 and provides the computed identifier to requester device A 950A and requester device B 950B respectively, at operation 920 and operation 922 respectively. Operation 918 is performed to determine the respective device associated with time T1 even if there are no requests for the global device identifier. After the identifier is requested in operations 914 and 916, the global identifier can be directly provided by operations 920 and 922.

Figure 10:
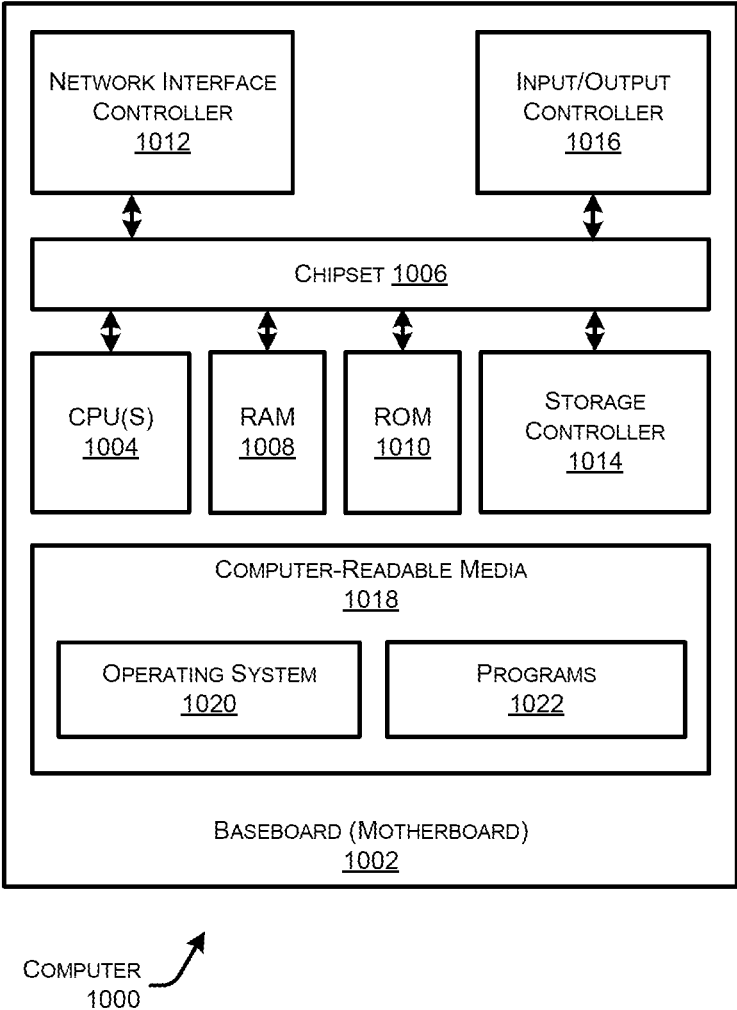
FIG. 10 shows an example computer architecture for a computing device (or network routing device) capable of executing program components for implementing the functionality described above.

FIG. 10 shows an example computer architecture for a computing device (or network routing device) 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computing device 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computing device 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computing device 1000. The chipset 1006 can further provide an interface to a computer-readable storage medium such as a read-only memory ("ROM") 1010 or non-volatile RAM ("NVRAM") for storing basic routines that help to startup the computing device 1000 and to transfer information between the various components and devices. The ROM 1010 or NVRAM can also store other software components necessary for the operation of the computing device 1000 in accordance with the configurations described herein.

The computing device 1000 can operate in a networked environment using logical connections to remote computing devices and computer systems through a network. The chipset 1006 can include functionality for providing network connectivity through a NIC 1012, such as a gigabit Ethernet adapter. The NIC 1012 is capable of connecting the computing device 1000 to other computing devices over the network. It should be appreciated that multiple NICs 1012 can be present in the computing device 1000, connecting the computer to other types of networks and remote computer systems.

The computing device 1000 can be connected to a storage device 1018 that provides non-volatile storage for the computing device 1000. The storage device 1018 can store an operating system 1020, programs 1022, and data, which have been described in greater detail herein. The storage device 1018 can be connected to the computing device 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1000 can store data on the storage device 1018 by transforming the physical state of the physical storage units to reflect the information being stored.

The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computing device 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 can further read information from the storage device 1018 by detecting the physical states or characteristics of one or more particular locations within the physical storage units.

In addition to the mass storage device 1018 described above, the computing device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1000. In some examples, the operations performed by a network, and/or any components included therein (e.g., a router, such as an edge router), may be supported by one or more devices similar to computing device 1000. Stated otherwise, some or all of the operations performed by the network, and or any components included therein, may be performed by one or more computing device 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computing device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computing device 1000.

In one embodiment, the storage device 1018 or other computer-readable storage media is encoded with computer-executable instructions which, when loaded into the computing device 1000, transform the computer from a general-purpose computing system into a special-purpose computer capable of implementing the embodiments described herein. These computer-executable instructions transform the computing device 1000 by specifying how the CPUs 1004 transition between states, as described above. According to one embodiment, the computing device 1000 has access to computer-readable storage media storing computer-executable instructions which, when executed by the computing device 1000, perform the various processes described above with regard to FIGS. 1-9. The computing device 1000 can also include computer-readable storage media having instructions stored thereupon for performing any of the other computer-implemented operations described herein.

The computing device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computing device 1000 might not include all of the components shown in FIG. 10, can include other components that are not explicitly shown in FIG. 10, or might utilize an architecture completely different than that shown in FIG. 10.

The computing device 1000 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 1000 may also support other software layers, such as middleware, application frameworks, or databases, that provide additional abstraction and services to application developers and users. In some cases, the computing device 1000 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving first monitoring data from a first computing entity, wherein the first monitoring data represents a first event determined by monitoring a computing device, and wherein the first monitoring data comprises a first identifier for the computing device;
   receiving second monitoring data from a second computing entity, wherein the second monitoring data represents a second event determined by monitoring the computing device, and wherein the second monitoring data comprises a second identifier for the computing device;
   determining, based on mapping data, that both the first identifier and the second identifier map to a common global identifier for the computing device;
   based on determining that both the first identifier and the second identifier map to the common global identifier, providing first feedback data to the first computing entity, wherein the first feedback data represents that the first identifier and the second identifier relate to the common global identifier; and
   providing second feedback data to at least one of: (i) a third computing entity that is configured to enable retrieval of the first monitoring data and the second monitoring data using a common interface, (ii) a fourth computing entity that is configured to retrieve the first monitoring data and the second monitoring data using the common interface and determine a security prediction based on the first monitoring data and the second monitoring data, or (iii) a fifth computing entity that is configured to perform a responsive operation based on the security prediction, wherein the second feedback data represents that the first identifier and the second identifier relate to the common global identifier.

2. The method of claim 1, further comprising:
   receiving a query from a third computing entity, wherein the third computing entity is configured to store the first monitoring data and the second monitoring data and enable retrieval of the first monitoring data and the second monitoring data using a common access interface, and wherein the query comprises the first identifier; and
   providing the second feedback data to the third computing entity, wherein the second feedback data represents that the first identifier and the second identifier relate to the common global identifier, and wherein the third computing entity is configured to determine an association of the first monitoring data and the second monitoring data based on the second feedback data and store the first monitoring data and the second monitoring data based on the association.

3. The method of claim 1, further comprising:
   receiving a query from a third computing entity, wherein the third computing entity is configured to determine a security prediction based on the first monitoring data and the second monitoring data, and wherein query comprises the first identifier; and
   providing the second feedback data to the third computing entity, wherein the second feedback data represents that the first identifier and the second identifier relate to the common global identifier, and wherein the third computing entity is configured to determine the security prediction based on the second feedback data.

4. The method of claim 1, further comprising:
   receiving a query from a third computing entity, wherein the third computing entity is configured to perform a responsive operation in relation to the computing device based on the first monitoring data and the second monitoring data, and wherein query comprises the first identifier; and providing the second feedback data to the third computing entity, wherein the second feedback data represents that the first identifier and the second identifier relate to the common global identifier, and wherein the third computing entity is configured to determine the responsive operation based on the second feedback data.

5. The method of claim 1, further comprising determining the mapping data, and wherein determining the mapping data comprises:

determining a first association between the first identifier and the common global identifier;

storing the first association on a first storage component at a first time, wherein the first storage component stores a recent subset of the mapping data;

at a second time, based on determining that a threshold period has passed since the first time, storing the first association on a second storage component, wherein the second storage component stores a historical subset of the mapping data;

determining a second association between the first identifier and the common global identifier; and storing the second association at a third time, wherein the third time occurs after the second time.

6. The method of claim 5, wherein:

the first monitoring data and the second monitoring data are both received after the third time but before the threshold period has passed since the third time, and determining that both the first identifier and the second identifier relate to the common global identifier comprises:

based on receiving the first monitoring data, querying the first storage component to determine that the first identifier maps to the common global identifier, and based on receiving the second monitoring data: (i) querying the first storage component to determine a need to query the second storage component, and (ii) querying the second storage component to determine that the second identifier maps to the common global identifier.

7. The method of claim 1, wherein the first computing entity is configured to:

determine a third event associated with the first identifier; and determine third monitoring data based on the third event and the first feedback data, wherein:

the third monitoring data represents that the third event relates to at least one of the common global identifier or the second identifier, and the method comprises receiving the third monitoring data.

8. The method of claim 1, wherein the first computing entity is configured to:

determine a third event associated with the first identifier;

determine a fourth event associated with the second identifier; and based on the first feedback data, determine third monitoring data based on both the third event and the fourth event, wherein the method comprises receiving the third monitoring data.

9. A system comprising:

one or more processors; and one or more computer-readable media storing computer-executable instructions that, when executed by the one or more processors, cause the one or more processors to perform operations comprising:

receiving first monitoring data from a first computing entity, wherein the first monitoring data represents a first event determined by monitoring a computing device, and wherein the first monitoring data comprises a first identifier for the computing device;

receiving second monitoring data from a second computing entity, wherein the second monitoring data represents a second event determined by monitoring the computing device, and wherein the second monitoring data comprises a second identifier for the computing device;

determining, based on mapping data, that both the first identifier and the second identifier map to a common global identifier for the computing device; and based on determining that both the first identifier and the second identifier map to the common global identifier, providing first feedback data to the first computing entity, wherein the first feedback data represents that the first identifier and the second identifier relate to the common global identifier; and providing second feedback data to at least one of: (i) a third computing entity that is configured to enable retrieval of the first monitoring data and the second monitoring data using a common interface, (ii) a fourth computing entity that is configured to retrieve the first monitoring data and the second monitoring data using the common interface and determine a security prediction based on the first monitoring data and the second monitoring data, or (iii) a fifth computing entity that is configured to perform a responsive operation based on the security prediction, wherein the second feedback data represents that the first identifier and the second identifier relate to the common global identifier.

10. The system of claim 9, further comprising:

receiving a query from a third computing entity, wherein the third computing entity is configured to store the first monitoring data and the second monitoring data and enable retrieval of the first monitoring data and the second monitoring data using a common access interface, and wherein the query comprises the first identifier; and providing the second feedback data to the third computing entity, wherein the second feedback data represents that the first identifier and the second identifier relate to the common global identifier, and wherein the third computing entity is configured to determine an association of the first monitoring data and the second monitoring data based on the second feedback data and store the first monitoring data and the second monitoring data based on the association.

11. The system of claim 9, further comprising:

receiving a query from a third computing entity, wherein the third computing entity is configured to determine a security prediction based on the first monitoring data and the second monitoring data, and wherein query comprises the first identifier; and providing the second feedback data to the third computing entity, wherein the second feedback data represents that the first identifier and the second identifier relate to the common global identifier, and wherein the third computing entity is configured to determine the security prediction based on the second feedback data.

12. The system of claim 9, further comprising:

receiving a query from a third computing entity, wherein the third computing entity is configured to perform a responsive operation in relation to the computing device based on the first monitoring data and the second monitoring data, and wherein query comprises the first identifier; and providing the second feedback data to the third computing entity, wherein the second feedback data represents that the first identifier and the second identifier relate to the common global identifier, and wherein the third computing entity is configured to determine the responsive operation based on the second feedback data.

13. One or more non-transitory computer-readable media storing instructions executable by one or more processors, wherein the instructions, when executed, cause the one or more processors to perform operations comprising:

receiving first monitoring data from a first computing entity, wherein the first monitoring data represents a first event determined by monitoring a computing device, and wherein the first monitoring data comprises a first identifier for the computing device;

receiving second monitoring data from a second computing entity, wherein the second monitoring data represents a second event determined by monitoring the computing device, and wherein the second monitoring data comprises a second identifier for the computing device;

determining, based on mapping data, that both the first identifier and the second identifier map to a common global identifier for the computing device; and based on determining that both the first identifier and the second identifier map to the common global identifier, providing first feedback data to the first computing entity, wherein the first feedback data represents that the first identifier and the second identifier relate to the common global identifier; and providing second feedback data to at least one of: (i) a third computing entity that is configured to enable retrieval of the first monitoring data and the second monitoring data using a common interface, (ii) a fourth computing entity that is configured to retrieve the first monitoring data and the second monitoring data using the common interface and determine a security prediction based on the first monitoring data and the second monitoring data, or (iii) a fifth computing entity that is configured to perform a responsive operation based on the security prediction, wherein the second feedback data represents that the first identifier and the second identifier relate to the common global identifier.

14. The one or more non-transitory computer-readable media of claim 13, further comprising:

receiving a query from a third computing entity, wherein the third computing entity is configured to store the first monitoring data and the second monitoring data and enable retrieval of the first monitoring data and the second monitoring data using a common access interface, and wherein the query comprises the first identifier; and providing the second feedback data to the third computing entity, wherein the second feedback data represents that the first identifier and the second identifier relate to the common global identifier, and wherein the third computing entity is configured to determine an association of the first monitoring data and the second monitoring data based on the second feedback data and store the first monitoring data and the second monitoring data based on the association.

15. The one or more non-transitory computer-readable media of claim 13, the operations further comprising:

receiving a query from a third computing entity, wherein the third computing entity is configured to determine a security prediction based on the first monitoring data and the second monitoring data, and wherein query comprises the first identifier; and providing the second feedback data to the third computing entity, wherein the second feedback data represents that the first identifier and the second identifier relate to the common global identifier, and wherein the third computing entity is configured to determine the security prediction based on the second feedback data.

16. The one or more non-transitory computer-readable media of claim 13, the operations further comprising:

receiving a query from a third computing entity, wherein the third computing entity is configured to perform a responsive operation in relation to the computing device based on the first monitoring data and the second monitoring data, and wherein query comprises the first identifier; and providing the second feedback data to the third computing entity, wherein the second feedback data represents that the first identifier and the second identifier relate to the common global identifier, and wherein the third computing entity is configured to determine the responsive operation based on the second feedback data.

17. The method of claim 1, wherein the first computing entity is associated with a first security type and the second computing entity is associated with a second security type, the first security type being different from the second security type.

18. The system of claim 9, the operations further comprising determining the mapping data, and wherein determining the mapping data comprises:

determining a first association between the first identifier and the common global identifier;

storing the first association on a first storage component at a first time, wherein the first storage component stores a recent subset of the mapping data;

at a second time, based on determining that a threshold period has passed since the first time, storing the first association on a second storage component, wherein the second storage component stores a historical subset of the mapping data;

determining a second association between the first identifier and the common global identifier; and storing the second association at a third time, wherein the third time occurs after the second time.

19. The one or more non-transitory computer-readable media of claim 13, the operations further comprising determining the mapping data, and wherein determining the mapping data comprises:

determining a first association between the first identifier and the common global identifier;

storing the first association on a first storage component at a first time, wherein the first storage component stores a recent subset of the mapping data;

at a second time, based on determining that a threshold period has passed since the first time, storing the first association on a second storage component, wherein the second storage component stores a historical subset of the mapping data;

determining a second association between the first identifier and the common global identifier; and storing the second association at a third time, wherein the third time occurs after the second time.

\*    \*    \*    \*    \*